United States Patent
Chapiro

(10) Patent No.: US 10,571,716 B2
(45) Date of Patent: Feb. 25, 2020

(54) EYEWEAR WITH MELANOPICALLY-INFORMED OPTICAL CHARACTERISTICS AND SMART CONNECTIVITY

(71) Applicant: Michael Chapiro, San Luis Obispo, CA (US)

(72) Inventor: Michael Chapiro, San Luis Obispo, CA (US)

(73) Assignee: Human Foundations Inc., Seattle, WA (US)

( * ) Notice: Subject to any disclaimer, the term of this patent is extended or adjusted under 35 U.S.C. 154(b) by 216 days.

(21) Appl. No.: 15/876,096

(22) Filed: Jan. 19, 2018

(65) Prior Publication Data
US 2018/0217401 A1    Aug. 2, 2018

Related U.S. Application Data

(60) Provisional application No. 62/453,419, filed on Feb. 1, 2017.

(51) Int. Cl.
| | | |
|---|---|---|
| *G02C 7/10* | (2006.01) | |
| *G02C 7/02* | (2006.01) | |
| *G02C 11/00* | (2006.01) | |

(52) U.S. Cl.
CPC ............... *G02C 7/022* (2013.01); *G02C 7/10* (2013.01); *G02C 7/104* (2013.01); *G02C 11/10* (2013.01)

(58) Field of Classification Search
CPC .......... G02C 7/104; G02C 7/02; G02C 11/10; G02C 7/081; G02C 7/107; G02C 7/10
USPC ........ 351/44, 159.3, 159.29, 159.31, 159.32, 351/159.65, 159.66
See application file for complete search history.

(56) References Cited

U.S. PATENT DOCUMENTS 8,911,082 B2 * 12/2014 Ambler ................. G02C 7/104
351/159.62

\* cited by examiner

*Primary Examiner* — Hung X Dang
(74) *Attorney, Agent, or Firm* — Fitch, Even, Tabin & Flannery LLP

(57) ABSTRACT

Eyeglasses are described that have optical transmission curves capable of directing selected wavelengths of light to the eyes based on the response of intrinsically photosensitive ganglion retinal cells (IPGRC). In one embodiment, glasses for evening use are described that block blue portions of the visible spectrum. In another embodiment for evening use, blue portions are blocked but violet light is transmitted. In an embodiment for daytime use, blue light is transmitted and red light is blocked.

60 Claims, 14 Drawing Sheets

EYEWEAR WITH MELANOPICALLY-INFORMED OPTICAL CHARACTERISTICS AND SMART CONNECTIVITY

This application claims the benefit of U.S. Provisional Application No. 62/453,419, filed Feb. 1, 2017, for EYEWEAR WITH MELANOPICALLY-INFORMED OPTICAL CHARACTERISTICS AND SMART CONNECTIVITY, which is incorporated in its entirety herein by reference.

BACKGROUND OF THE INVENTION

1. Field of the Invention

The present invention relates generally to eye protection, and more specifically to protecting eyes from harmful radiation by varying the optical density of a lens.

2. Discussion of the Related Art

Various systems and processes are known in the art for protecting eyes from harmful radiation by varying the optical density of a lens.

Nighttime light exposure is known to disrupt the circadian rhythm, impair sleep, reduce melatonin, and in doing so has been implicated in a number of diseases including cancers, neurodegenerative diseases, and metabolic disorders. Thus, glasses with optical properties designed for daytime use may not be appropriate for use in the evening or nighttime.

SUMMARY

Eyeglasses are described that have optical transmission curves capable of directing selected wavelengths of light to the eyes based on the response of intrinsically photosensitive ganglion retinal cells (IPGRCs). In one embodiment, glasses for evening use are described that block blue portions of the visible spectrum. In another embodiment for evening use, blue portions are blocked but violet light is transmitted. In an embodiment for daytime use, blue light is transmitted and red light is blocked.

In one embodiment, eyeglasses may include a first lens, where the first lens has an optical density of at least 0.75 from 450 nm to 500 nm, and an optical density of no more than 0.5 from 500 nm to 600 nm, a second lens, where the second lens has an optical density of at least 0.75 from 450 nm to 500 nm, and an optical density of no more than 0.5 from 500 nm to 600 nm, a frame, a bridge portion of the frame interposed between the first lens and the second lens, a first arm of the frame coupled to the first lens, a second arm of the frame coupled to the second lens, and the first lens and the second lens define an area of a person's eyes covered by the first lens and the second lens and an area of the person's eyes not covered by the first lens and the second lens, where the area of the person's eyes not covered by the first lens and the second lens comprises 5% to 50% of a total area of the person's eyes.

A method of making a system for eye protection is described. The method may include providing a first lens, where the first lens has an optical density of at least 0.75 from 450 nm to 500 nm, and an optical density of no more than 0.5 from 500 nm to 600 nm, providing a second lens, where the second lens has an optical density of at least 0.75 from 450 nm to 500 nm, and an optical density of no more than 0.5 from 500 nm to 600 nm, providing a frame, providing a bridge portion of the frame interposed between the first lens and the second lens, providing a first arm of the frame coupled to the first lens, providing a second arm of the frame coupled to the second lens, and the first lens and the second lens define an area of a person's eyes covered by the first lens and the second lens and an area of the person's eyes not covered by the first lens and the second lens, where the area of the person's eyes not covered by the first lens and the second lens comprises 5% to 50% of a total area of the person's eyes.

A method of eye protection is described. The method may include using a first lens, where the first lens has an optical density of at least 0.75 from 450 nm to 500 nm, and an optical density of no more than 0.5 from 500 nm to 600 nm, using a second lens, where the second lens has an optical density of at least 0.75 from 450 nm to 500 nm, and an optical density of no more than 0.5 from 500 nm to 600 nm, using a frame, using a bridge portion of the frame interposed between the first lens and the second lens, using a first arm of the frame coupled to the first lens, using a second arm of the frame coupled to the second lens, and the first lens and the second lens define an area of a person's eyes covered by the first lens and the second lens and an area of the person's eyes not covered by the first lens and the second lens, where the area of the person's eyes not covered by the first lens and the second lens comprises 5% to 50% of a total area of the person's eyes.

In some examples of the eyeglasses described above, the first lens may have an optical density of at least 0.75 from 450 nm to 540 nm. In some examples of the eyeglasses described above, the second lens may have an optical density of at least 0.75 from 450 nm to 540 nm.

In some examples of the eyeglasses described above, the first lens may have an optical density of at least 0.75 from 450 nm to 550 nm. In some examples of the eyeglasses described above, the second lens may have an optical density of at least 0.75 from 450 nm to 550 nm.

In some examples of the eyeglasses described above, the first lens may have an optical density of at least 0.75 from 450 nm to 560 nm. In some examples of the eyeglasses described above, the second lens may have an optical density of at least 0.75 from 450 nm to 560 nm.

In some examples of the eyeglasses described above, the first lens may have an optical density of at least 0.75 from 450 nm to 570 nm. In some examples of the eyeglasses described above, the second lens may have an optical density of at least 0.75 from 450 nm to 570 nm.

In some examples of the eyeglasses described above, the first lens may have an optical density of at least 0.75 from 450 nm to 580 nm. In some examples of the eyeglasses described above, the second lens may have an optical density of at least 0.75 from 450 nm to 580 nm.

In some examples of the eyeglasses described above, the first lens and the second lens define an area of the person's eyes covered by the first lens and the second lens and an area of the person's eyes not covered by the first lens and the second lens, where the area of the person's eyes not covered by the first lens and the second lens comprises 20% of said total area of the person's eyes.

In some examples of the eyeglasses described above, the first lens may have an optical density of at least 1 from 400 nm to 500 nm, and an optical density of no more than 0.5 from 500 nm to 600 nm. In some examples of the eyeglasses described above, the second lens may have an optical density of at least 1 from 400 nm to 500 nm, and an optical density of no more than 0.5 from 500 nm to 600 nm.

In some examples of the eyeglasses described above, said frame further comprises a camera. In some examples of the eyeglasses described above, said frame further comprises a sensor configured to determine whether the eyeglass may be being worn.

In one embodiment, eyeglasses may include a first lens, where the first lens has an optical density of at least 0.75 from 450 nm to 500 nm, and an optical density of no more than 0.5 from 600 nm to 700 nm, a second lens, where the second lens has an optical density of at least 0.75 from 450 nm to 500 nm, and an optical density of no more than 0.5 from 600 nm to 700 nm, a frame comprising a bridge portion of the frame interposed between the first lens and the second lens, a first arm of the frame coupled to the first lens, a second arm of the frame coupled to the second lens, and the first lens and the second lens define an area of a person's eyes covered by the first lens and the second lens and an area of the person's eyes not covered by the first lens and the second lens, where the area of the person's eyes not covered by the first lens and the second lens comprises 5% to 50% of a total area of the person's eyes.

A method of making a system for eye protection is described. The method may include providing a first lens, where the first lens has an optical density of at least 0.75 from 450 nm to 500 nm, and an optical density of no more than 0.5 from 600 nm to 700 nm, providing a second lens, where the second lens has an optical density of at least 0.75 from 450 nm to 500 nm, and an optical density of no more than 0.5 from 600 nm to 700 nm, providing a frame, providing a bridge portion of the frame interposed between the first lens and the second lens, providing a first arm of the frame coupled to the first lens, providing a second arm of the frame coupled to the second lens, and the first lens and the second lens define an area of a person's eyes covered by the first lens and the second lens and an area of the person's eyes not covered by the first lens and the second lens, where the area of the person's eyes not covered by the first lens and the second lens comprises 5% to 50% of a total area of the person's eyes.

A method of eye protection is described. The method may include using a first lens, where the first lens has an optical density of at least 0.75 from 450 nm to 500 nm, and an optical density of no more than 0.5 from 600 nm to 700 nm, using a second lens, where the second lens has an optical density of at least 0.75 from 450 nm to 500 nm, and an optical density of no more than 0.5 from 600 nm to 700 nm, using a frame, using a bridge portion of the frame interposed between the first lens and the second lens, using a first arm of the frame coupled to the first lens, using a second arm of the frame coupled to the second lens, and the first lens and the second lens define an area of a person's eyes covered by the first lens and the second lens and an area of the person's eyes not covered by the first lens and the second lens, where the area of the person's eyes not covered by the first lens and the second lens comprises 5% to 50% of a total area of the person's eyes.

In some examples of the eyeglasses described above, the first lens may have optical density of no more than 0.5 from 400 nm to 425 nm. In some examples of the eyeglasses described above, the second lens may have an optical density of no more than 0.5 from 400 nm to 425 nm.

In one embodiment, a method may include directing broad-spectrum visible light having light frequencies across a range of wavelengths from 380 nm to 720 nm toward an eye of a subject, interposing a lens between the eye and the broad-spectrum visible light, where the lens has an optical density of at least 0.75 from 450 nm to 500 nm, and an optical density of no more than 0.5 from 500 nm to 600 nm, and the lens defines an area of the eye covered by the lens and an area of the eye not covered by the lens, where the area of the eye not covered by the lens comprises 5% to 50% of a total area of the eye.

In one embodiment, a system may include one or more components configured to direct broad-spectrum visible light having light frequencies across a range of wavelengths from 380 nm to 720 nm toward an eye of a subject, interpose a lens between the eye and the broad-spectrum visible light, where the lens has an optical density of at least 0.75 from 450 nm to 500 nm, and an optical density of no more than 0.5 from 500 nm to 600 nm, and the lens defines an area of the eye covered by the lens and an area of the eye not covered by the lens, where the area of the eye not covered by the lens comprises 5% to 50% of a total area of the eye.

In one embodiment, an apparatus may include means for directing broad-spectrum visible light having light frequencies across a range of wavelengths from 380 nm to 720 nm toward an eye of a subject, means for interposing a lens between the eye and the broad-spectrum visible light, where the lens has an optical density of at least 0.75 from 450 nm to 500 nm, and an optical density of no more than 0.5 from 500 nm to 600 nm, and the lens defines an area of the eye covered by the lens and an area of the eye not covered by the lens, where the area of the eye not covered by the lens comprises 5% to 50% of a total area of the eye.

In some examples of the method, system, and apparatus described above, said interposing comprises interposing said lens at nighttime.

Some examples of the method, system, and apparatus described above may further include processes, features, means, or instructions for interposing another lens between the eye and the broad-spectrum visible light, where the lens may have an optical density of no more than 1 from 400 nm to 500 nm, and an optical density of at least 0.75 from 600 nm to 700 nm.

In some examples of the method, system, and apparatus described above, said interposing said other lens comprises interposing said other lens at daytime.

In one embodiment, a method may include directing broad-spectrum visible light having light frequencies across a range of wavelengths from 380 nm to 720 nm toward an eye of a subject, interposing a lens between the eye and the broad-spectrum visible light, where the lens has an optical density of at least 0.75 from 450 nm to 500 nm, and an optical density of no more than 0.5 from 600 nm to 700 nm, and the lens defines an area of the eye covered by the lens and an area of the eye not covered by the lens, where the area of the eye not covered by the lens comprises 5% to 50% of a total area of the eye.

In one embodiment, a system may include one or more components configured to direct broad-spectrum visible light having light frequencies across a range of wavelengths from 380 nm to 720 nm toward an eye of a subject, interpose a lens between the eye and the broad-spectrum visible light, where the lens has an optical density of at least 0.75 from 450 nm to 500 nm, and an optical density of no more than 0.5 from 600 nm to 700 nm, and the lens defines an area of the eye covered by the lens and an area of the eye not covered by the lens, where the area of the eye not covered by the lens comprises 5% to 50% of a total area of the eye.

In one embodiment, an apparatus may include means for directing broad-spectrum visible light having light frequencies across a range of wavelengths from 380 nm to 720 nm toward an eye of a subject, means for interposing a lens between the eye and the broad-spectrum visible light, where the lens has an optical density of at least 0.75 from 450 nm to 500 nm, and an optical density of no more than 0.5 from 600 nm to 700 nm, and the lens defines an area of the eye covered by the lens and an area of the eye not covered by the lens, where the area of the eye not covered by the lens comprises 5% to 50% of a total area of the eye.

In some examples of the method, system, and apparatus described above, said interposing comprises interposing said lens at nighttime.

Some examples of the method, system, and apparatus described above may further include processes, features, means, or instructions for interposing another lens between the eye and the broad-spectrum visible light, where the lens may have an optical density of no more than 1 from 400 nm to 500 nm, and an optical density of at least 0.75 from 600 nm to 700 nm.

In some examples of the method, system, and apparatus described above, said interposing said other lens comprises secondly interposing said other lens at daytime.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Visible light may be defined as electromagnetic radiation that is visible to the human eye (i.e., with a wavelength from 380 nm to 720 nm, between the UV radiation portion and the infrared portion of the spectrum). The electromagnetic spectrum may also include UV radiation, infrared radiation, and radio waves.

Nighttime light exposure is known to disrupt the circadian rhythm, impair sleep, reduce melatonin, and in doing so has been implicated in a number of diseases including cancers, neurodegenerative diseases, and metabolic disorders. The glasses disclosed herein are not medical devices since they do nothing to treat these diseases—it is only the case that harmful light exists and these glasses filter that light, which is not a treatment, but rather ensures the absence of a treatment known to be harmful (a further example: a doctor cannot prescribe the absence of a drug to a patient, and even without a prescription, all are free to imbibe in the absence of any drug of their choice without it being a medical treatment). Nevertheless, while many people are aware of the harmful effects of nighttime light exposure, less attention is paid to the also important issue of ensuring sufficient light intake during the day.

Figure 1:
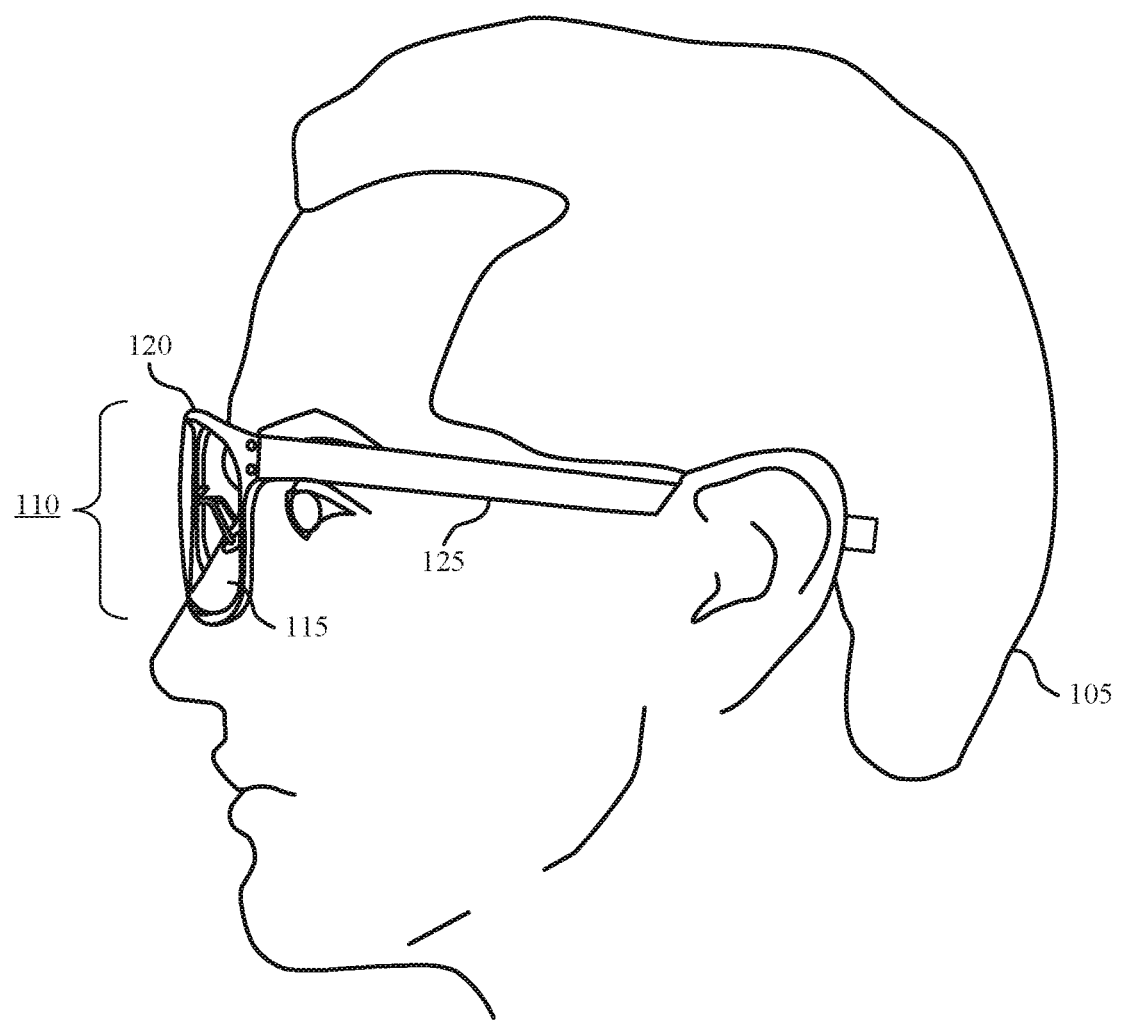
FIGS. 1 through 3 show diagrams of eyeglasses that supports protecting eyes from harmful radiation by varying the optical density of a lens in accordance with aspects of the present disclosure.

FIG. 1 shows a diagram 100 of eyeglasses 110 that supports protecting eyes from harmful radiation by varying the optical density of a lens in accordance with aspects of the present disclosure. Diagram 100 may include user 105 and eyeglasses 110. Eyeglasses 110 may be blue blocking eyeglasses as described herein.

Eyeglasses 110 may incorporate aspects of eyeglasses 205 and 305 as described with reference to FIGS. 2 and 3. In some examples, eyeglasses 110 may include lenses 115, frame 120, and arms 125. In some cases, lenses 115 are red in appearance (i.e., red lenses).

It may be appropriate to adopt different designs for 'blue blocking' lenses designed based on the light response of intrinsically photosensitive ganglion retinal cells (IPGRCs) and associated health and sleep impacts as opposed to lenses optimized for use in altering outdoor contrast perception, or for reducing retinal risks under sunlight or laser exposure. Thus, one example of blue-blocking eyewear is focused on use after sunset and before going to sleep. This blue blocking technology may be motivated by the purposes of improving sleep and health by removing the alterations to the circadian rhythm from medically impactful electronic devices such as computers and lights. Another example of blue-blocking eyewear may include lenses a reasonable person would consider to appear yellow. In some cases, yellow lenses are merely meant to be used for perceived eye-comfort rather than reducing harmful systemic circadian effects. Another example of blue-blocking eyewear includes the set of lenses that appear orange. This category of lenses may include safety glasses designed for the purpose of reducing light at 532 nm, which is a common wavelength for green lasers.

Since color may be a perceptual rather than rigorous physical phenomenon, subjective colors may be determined based on how people perceive them under specified conditions. For example, perceived colors may be determined at luminous intensities below 500 lux, under at least 50% indoor lighting, such that at least two thirds of reasonable persons would be in agreement on the color.

Under these perceptual considerations, a red lens may be beneficial, and such a lens could be constructed with a curve in accordance with the shaded regions shown. A lens that meets this definition of red may be represented by a different curve from those of lenses that appear orange.

Red lenses that also block green light may enable superior removal of light that would otherwise stimulate IPGRCs. In some cases, red lenses that are designed based on the response of IPGRCs to different wavelengths of light may be different from those designed to block specific wavelengths associated with lasers. These lenses may be designed with transmission curves that block 'just-enough' light, in order to increase visible light transmission. That is, in some cases it is preferable to enable increased visible light transmission for a given amount of reduction in IPGRC stimulation.

There is also scientific evidence that humans may be attracted to the color red (possibly due to an association of the color red with sexual appeal), and repelled by the color orange (possibly due to an association of the color orange with fire). Therefore, the use of red lenses may also have the benefit in increasing the probability that a human will desire to use the eyewear. Given the substantial reductions in productivity due to inefficiencies from sleep loss, aesthetic improvements from red lenses may have an economic impact. This demonstrates the relevance of referring to the perceptual color phenomenon rather than referring exclusively to transmission curves. Sales of an embodiment of these disclosures further demonstrate the benefit of aesthetic improvements in lens color.

In one embodiment, lens 115 may have an optical density of at least 0.75 from 450 nm to 500 nm, and an optical density of no more than 0.5 from 500 nm to 600 nm or from 600 nm to 700 nm. In other examples, lens 115 may have an optical density of at least 0.75 from 450 nm to 540 nm, from 450 nm to 550 nm, from 450 nm to 560 nm, from 450 nm to 570 nm, or from 450 nm to 580 nm.

In another embodiment, lens 115 has an optical density of no more than 1 from 400 nm to 500 nm, and an optical density of at least 0.75 from 500 nm to 600 nm or from 600 nm to 700 nm. In some cases, lens 115 may be interposed between the eye and the broad-spectrum visible light. Lens 115 may incorporate aspects of lenses 210, 215, 310, 315, and 420 as described with reference to FIGS. 2, 3, and 4.

In some cases, the lens 115 has optical density of no more than 0.5 from 400 nm to 425 nm. In some cases, the area of the eye not covered by the lens 115 comprises 5' to 50% of a total area of the eye. In some cases, the lens is used at nighttime. In some cases, the lens is used at daytime.

Frame 120 may incorporate aspects of frame 220, 320, and 415 as described with reference to FIGS. 2, 3, and 4. In some cases, the frame 120 further comprises a camera. In some cases, the frame 120 further comprises a sensor configured to determine whether the eyeglass is being worn.

Arm 125 may be a component of the frame 120 coupled to the lens 115. Arm 125 may incorporate aspects of arm 230, 235 and 330, 335 as described with reference to FIGS. 2 and 3.

Figure 2:
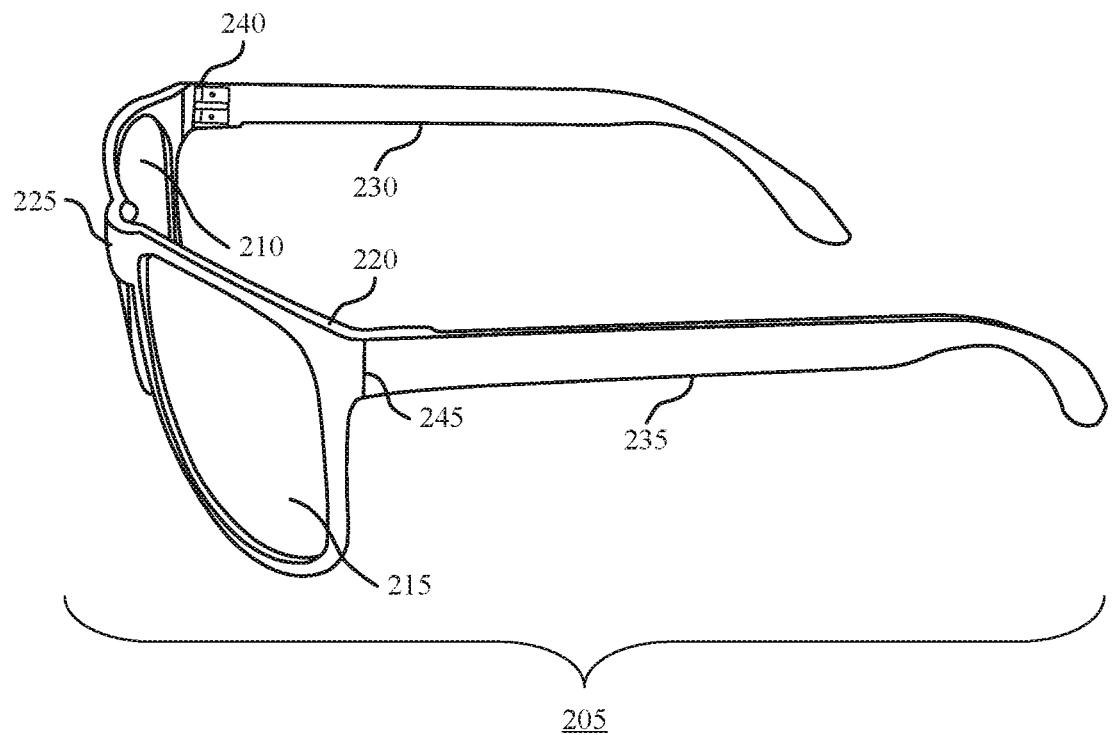

FIG. 2 shows a diagram 200 of eyeglasses 205 that supports protecting eyes from harmful radiation by varying the optical density of a lens in accordance with aspects of the present disclosure. Eyeglasses 205 may incorporate aspects of eyeglasses 110 and 305 as described with reference to FIGS. 1 and 3. In some examples, eyeglasses 205 may include first lens 210, second lens 215, frame 220, bridge 225, first arm 230, second arm 235, first hinge 240, and second hinge 245.

In one embodiment, first lens 210 may be configured with an optical density of at least 0.75 from 450 nm to 500 nm, and an optical density of no more than 0.5 from 500 nm to 600 nm. In one embodiment, first lens 210 may be configured with an optical density of at least 0.75 from 450 nm to 500 nm, and an optical density of no more than 0.5 from 600 nm to 700 nm. First lens 210 may also incorporate aspects of lens 115, 310, and 420 as described with reference to FIGS. 1, 3, and 4.

In one embodiment, second lens 215 may be configured with an optical density of at least 0.75 from 450 nm to 500 nm, and an optical density of no more than 0.5 from 500 nm to 600 nm. In one embodiment, second lens 215 may be configured with an optical density of at least 0.75 from 450 nm to 500 nm, and an optical density of no more than 0.5 from 600 nm to 700 nm. Second lens 215 may also incorporate aspects of lens 115, and 315 as described with reference to FIGS. 1 and 3.

In some cases, the first lens 210 and the second lens 215 define an area of a person's eyes covered by the first lens 210 and the second lens 215, and an area of the person's eyes not covered by the first lens 210 and the second lens 215, where the area of the person's eyes not covered by the first lens 210 and the second lens 215 comprises 5% to 50% of a total area of the person's eyes. In some cases, the first lens 210 and the second lens 215 define an area of a person's eyes covered by the first lens 210 and the second lens 215 and an area of the person's eyes not covered by the first lens 210 and the second lens 215, where the area of the person's eyes not covered by the first lens 210 and the second lens 215 comprises 5% to 50% of a total area of the person's eyes.

Frame 220 may incorporate aspects of frame 120, 320, and 415 as described with reference to FIGS. 1, 3, and 4. Bridge 225 may be interposed between the first lens 210 and the second lens 215. Bridge 225 may incorporate aspects of bridge 325 as described with reference to FIG. 3.

First arm 230 may be coupled to the first lens 210. Second arm 235 may be coupled to the second lens 215. First arm 230 and second arm 235 may incorporate aspects of arms 125, 330 and 335 as described with reference to FIGS. 1 and 3.

Figure 3:
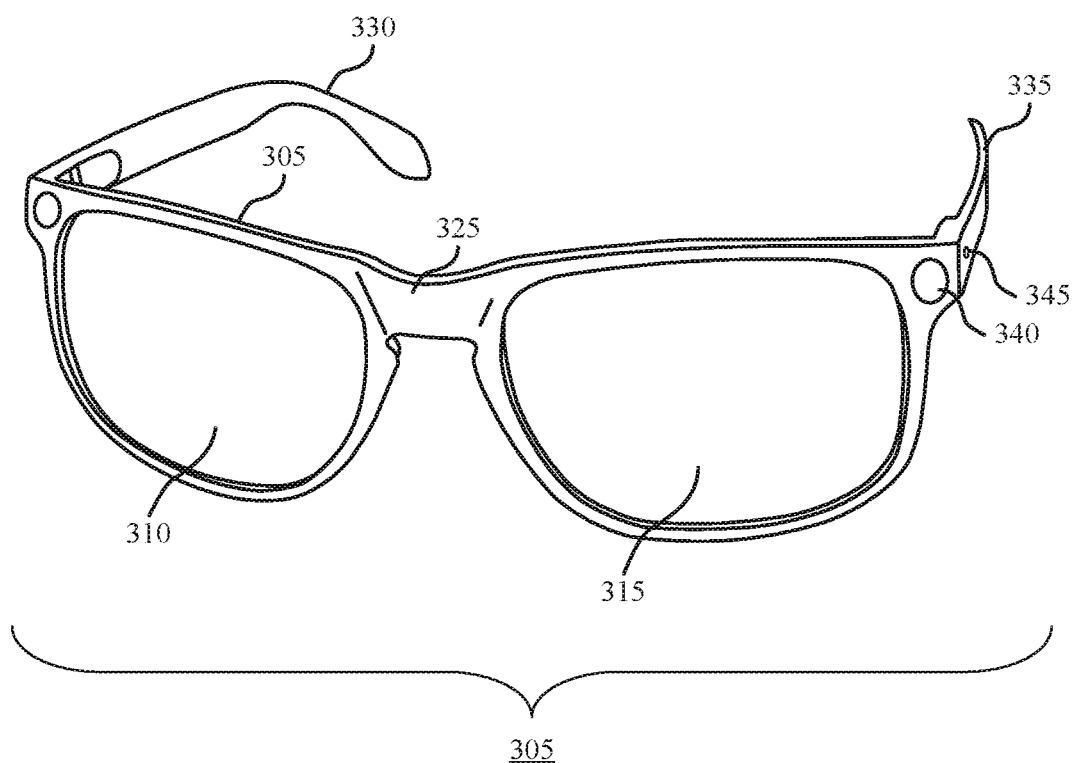

FIG. 3 shows a diagram 300 of eyeglasses 305 that supports protecting eyes from harmful radiation by varying the optical density of a lens in accordance with aspects of the present disclosure.

Eyeglasses 305 may incorporate aspects of eyeglasses 110 and 205 as described with reference to FIGS. 1 and 2. In some examples, eyeglasses 305 may include first lens 310, second lens 315, frame 320, bridge 325, first arm 330, second arm 335, camera 340, and sensor 345.

First lens 310 and second lens 315 may incorporate aspects of first lens 115, 210, 215 and 420 as described with reference to FIGS. 1, 2, and 4.

Frame 320 may incorporate aspects of frame 120, 220, and 415 as described with reference to FIGS. 1, 2, and 4. In some cases, the frame 320 further comprises a camera 340. In some cases, the frame 320 further comprises a sensor 345 configured to determine whether the eyeglass is being worn.

Bridge 325 may be an example of a component portion of the frame 320 interposed between the first lens 310 and the second lens 315. Bridge 325 may incorporate aspects of bridge 225 as described with reference to FIG. 2.

First arm 330 may be an example of a component of the frame 320 coupled to the first lens 310. Second arm 335 may be an example of a component of the frame 320 coupled to the second lens 315. First arm 330 and second arm 335 may incorporate aspects of arms 125, 230, and 235 as described with reference to FIGS. 1 and 2.

In some cases, the camera 340 may be positioned near the front of the glasses and the sensor 345 may be positioned on one of the arms. Thus, various optical aspects of the lenses can be implemented in a connected device, which may be referred to as "smart glasses". Other embodiments of smart glasses are also possible. For example, smart glasses may include a virtual or augmented reality function. A camera 340 is just one of the useful components that might be added. In some cases, glasses that are suitable for evening use may enable the use of a camera 340 feature after sunset. Within a connected device used to share photos this would be particularly beneficial since a large number of socially shared photos are taken at night.

A sensor 345 can include a wide variety of electronic components. The sensor 345 on the side can be used for various purposes and multiple sensors could be used for different functions (not shown). For example, a sensor 345 that determines when the glasses are being worn would allow monitoring of metrics that could be of interest to people interested in the quantified-self as well as health professionals.

Figure 4:
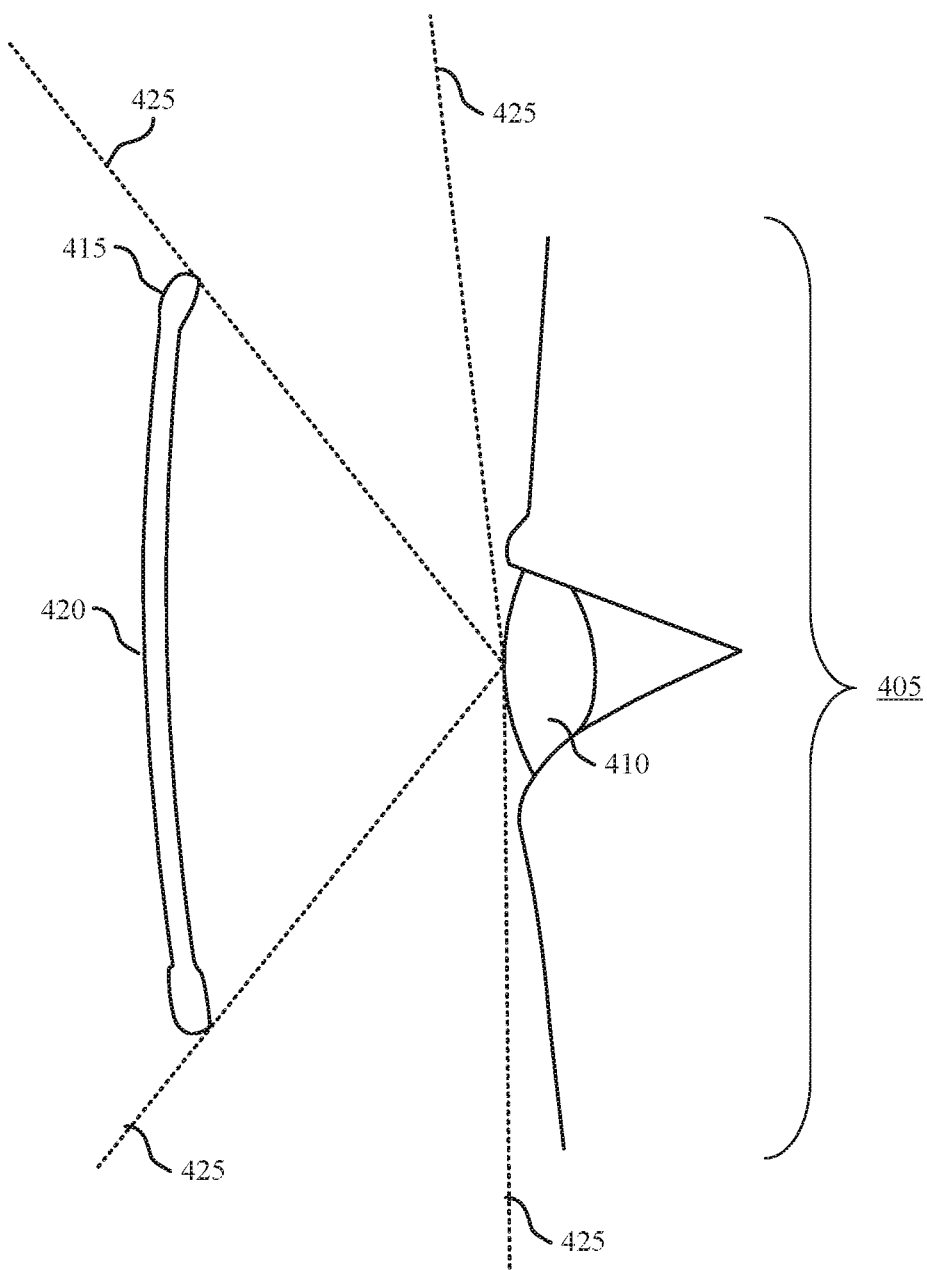
FIG. 4 shows a diagram of an eyeglass cross-section that supports protecting eyes from harmful radiation by varying the optical density of a lens in accordance with aspects of the present disclosure.

FIG. 4 shows a diagram 400 of an eyeglass cross-section that supports protecting eyes 410 from harmful radiation by varying the optical density of a lens in accordance with aspects of the present disclosure. Diagram 400 may include face 405, eye 410, frame 415, lens 420, and dashed lines 425.

Frame 415 may incorporate aspects of frame 120, 220, and 320 as described with reference to FIGS. 1, 2, and 3. Lens 420 may incorporate aspects of lenses 115, 210, 215, 310 and 315 as described with reference to FIGS. 1, 2, and 3.

One pair of dashed lines 425 emanates from the center of the eye 410 and passes just by the outer edges of the frame. The other pair of dashed lines 425 emanates from the center of the eye and passes just by the part of the face that protrudes the most. The dashed lines 425 represent a portion of light that bypasses a lens to reach the eye 410. This diagram shows a single cross-section, and by looking at similar cross-sections as one rotates about the eye, it is possible to compute an area between the dashed lines through which luminous flux can pass. This area can be compared to the luminous flux passing through the lens.

Some eyewear such as goggles can have 0% passing outside of the lens to eye 410. Safety glasses might have less than 5%. In one example, glasses such as those illustrated in FIGS. 1, 2, and 3 might have anywhere between 5% and 50% of light bypassing the lens 420 to eye 410. However, in other embodiments of the present disclosure, other amounts of light may bypass the lens 420. In some cases, it may be beneficial for high percentages of light to pass around the lens into the eye, and this light may be taken into account when selecting an appropriate transmission curve for a lens 420.

Figure 5:
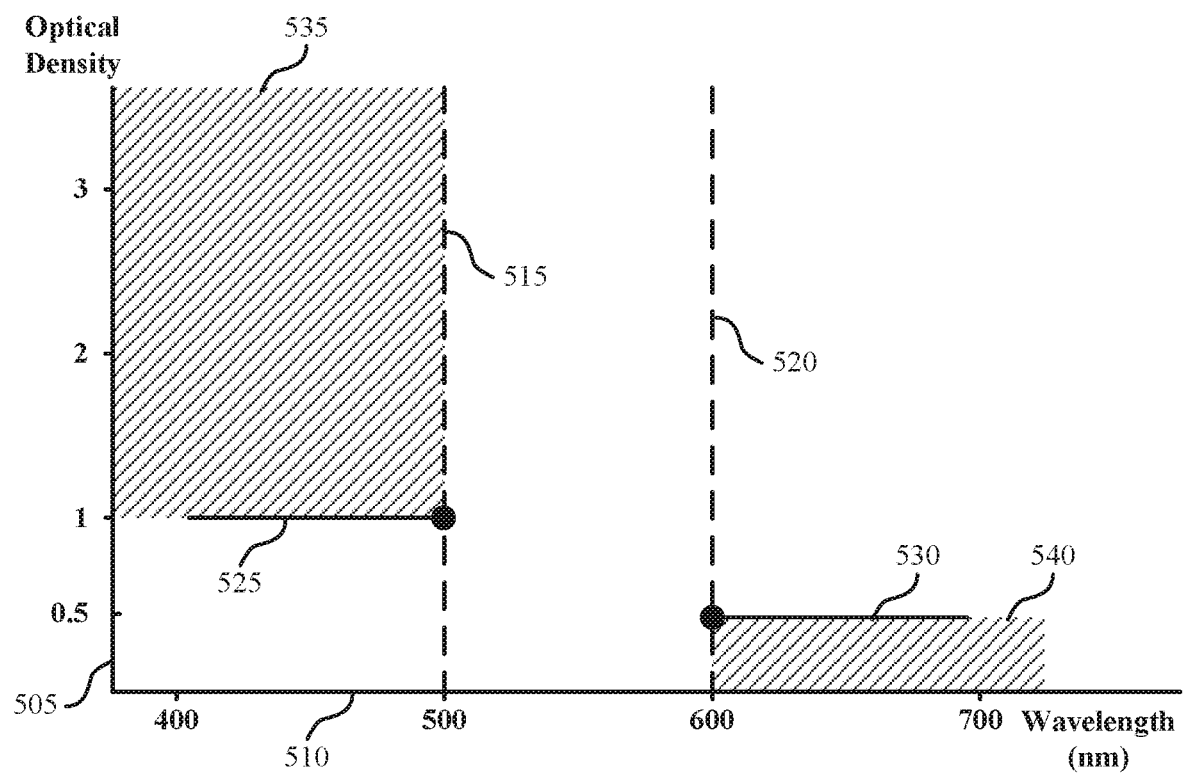
FIG. 5 shows a diagram of an optical transmission graph that supports protecting eyes from harmful radiation by varying the optical density of a lens in accordance with aspects of the present disclosure.

FIG. 5 shows a diagram 500 of an optical transmission graph that supports protecting eyes from harmful radiation by varying the optical density of a lens in accordance with aspects of the present disclosure. Specifically, diagram 500 represents an example of optical transmission characteristics of a lens as described in the present disclosure. Diagram 500 may include vertical axis 505, horizontal axis 510, first vertical line 515, second vertical line 520, first horizontal line 525, second horizontal line 530, first shaded region 535, and second shaded region 540.

A curve along this graph can define the optical properties of a lens across the entire visible light spectrum. This enables us to refer to the set of curves that passes through the shaded regions (first shaded region 535 and second shaded region 540), with the curve taking any functional value along the regions of the spectrum not subject to any constraint. The vertical dashed lines and horizontal lines are used to define a first shaded region 535 and a second shaded region 540 through which it would be beneficial to have the transmission curve of a particular lens pass.

The vertical axis 505 represents optical density. Optical density is a logarithmic measure of optical transmission of a structure such as a lens of a particular thickness where a value of 1 indicates 10% transmission and a value of 2 indicates 1% transmission. Vertical axis 505 may incorporate aspects of vertical axis 705, and 805 as described with reference to FIGS. 7 and 8.

The horizontal axis 510 represents the wavelength of light. Horizontal axis 510 may incorporate aspects of horizontal axis 610, 710, and 810 as described with reference to FIGS. 6, 7, and 8.

The axes are labelled and intersect at the origin of the cartesian chart. The numbers are shown with ticks along the axis. The horizontal axis 510 defines the visible light spectrum, which could also be defined as going from 380 to 720 nanometers, and the vertical axis 505 defines optical density.

The first vertical line 515 represents a boundary at a wavelength of 500 nm. First vertical line 515 may incorporate aspects of first vertical line 715 and 815 as described with reference to FIGS. 7 and 8.

The second vertical line 520 represents a boundary at 600 nm. The dashed vertical lines rise from particular places along the horizontal axis 510, and the horizontal lines are in the chart at particular vertical positions, spanning a width that is constrained at each end by either a vertical dashed line, an axis line or by reaching the end of the region of interest where this is considered to be 400 or 700 nanometers. Second vertical line 520 may incorporate aspects of second vertical line 720 and 820 as described with reference to FIGS. 7 and 8.

The first horizontal line 525 represents a boundary at an optical density of 1. First horizontal line 525 may incorporate aspects of first horizontal line 735 and 825 as described with reference to FIGS. 7 and 8.

The second horizontal line 530 represents a boundary at an optical density of 0.5. Second horizontal line 530 may incorporate aspects of second horizontal line 740 and 830 as described with reference to FIGS. 7 and 8.

This makes it clear that the horizontal lines indicate that the curve must be equal or greater to the intersecting optical density of the vertical axis 505 along the entire horizontal section shown (were the line to extend to intersect the vertical axis 505) if it is shaded above the horizontal line, and equal to or lower optical density throughout the horizontally defined portion of the spectrum if it is shaded below.

The first shaded region 535 is bounded by the first vertical line 515 and the first horizontal line 525. First shaded region 535 may incorporate aspects of first shaded region 750 and 835 as described with reference to FIGS. 7 and 8.

The second shaded region 540 is bounded by the second vertical line 520 and the second horizontal line 530. Second shaded region 540 may incorporate aspects of second shaded region 755 and 840 as described with reference to FIGS. 7 and 8.

Thus, the set of curves described by this figure can be seen to have an optical density of at least 1 from 400 to 500 nm, and no more than 0.5 from 500 to 600 nm. These curves effectively reduce the amount of blue light that passes through the lens, which is beneficial for eyewear that may be worn in the evening to reduce the stimulation of IPGRCs that are separate from the rods and cones involved with perceived vision. Blue light may be considered to be light in the 400 to 500 nm so for the purpose of 'blue-blocking'. In various examples, a lens could allow any amount of light to pass through the range of 500 to 600 nm.

For example, the first vertical line 515 at 500 nm may be shifted to the right for a red lens. As this line approaches 540 nm the lens may meet the definition of appearing red.

In some examples, the first vertical line 515 might extend as far as 550, 560, 570, or 580 nm. Moving the first vertical line 515 results in a modification of the set of curves that pass through the first shaded region 535. Functionally, this shift represents blocking a portion of light in the 500 to 600 nm range, which could be considered green light.

Figure 6:
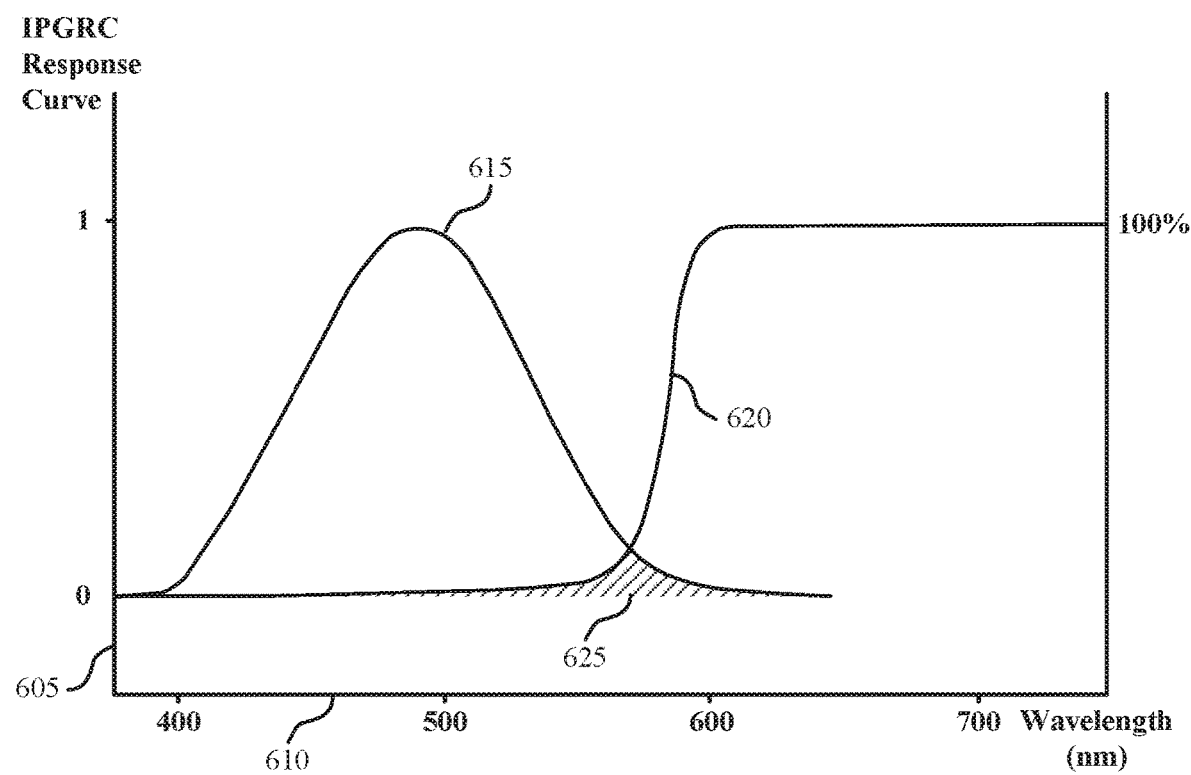
FIG. 6 shows a diagram of an intrinsically photosensitive ganglion retinal cells (IPGRC) response graph that supports protecting eyes from harmful radiation by varying the optical density of a lens in accordance with aspects of the present disclosure.

FIG. 6 shows a diagram 600 of an intrinsically photosensitive ganglion retinal cells (IPGRC) response graph that supports protecting eyes from harmful radiation by varying the optical density of a lens in accordance with aspects of the present disclosure. Diagram 600 may include vertical axis 605, horizontal axis 610, response curve 615, transmission curve 620, and shaded region 625.

The vertical axis 605 represents both the IPGRC response intensity (for response curve 615) and the amount of light that passes through a lens (for transmission curve 620).

The axes are labelled and intersect at the origin of the cartesian chart. The numbers are shown with ticks along the axis. The horizontal axis 610 defines the visible light spectrum, which could also be defined as going from 380 to 720 nanometers. Horizontal axis 610 may incorporate aspects of horizontal axis 510, 710, and 810 as described with reference to FIGS. 5, 7, and 8. The horizontal axis 610 represents the wavelength of light.

The shaded region 625 is the area that is below both the response curve 615 and the transmission curve, and above the horizontal axis 610 (i.e., above 0 on the vertical axis 605). The transmission curve 620 is represented on a scale that defines the optical transmission properties of a lens, where 100% represents all light passing through at that wavelength.

The response curve 615 represents the intensity of the IPGRC response to different wavelengths of light, and is scaled to 1. The response curve is drawn to approximate the actual curve, which is itself determined experimentally with non-trivial discrepancies (e.g. some researchers show the peak at 460 nm, while others show it 479 nm). However, the present figure can be easily understood despite any inaccuracies in the precise shape of the curve.

The inner product of the transmission curve 620 and the response curve 615 gives a value that defines a percentage of stimulation to the IPGRC given a certain ambient light source. This value can be considered as a metric for the efficacy of a lens independent of geometry. The illustrated transmission curve 620 represents one possible embodiment of a red lens. It may be seen that the illustrated transmission curve 620 enables a small area, which correlates with a low value for the inner product (although the area is not directly proportional to the inner product).

The red lens represented by the transmission curve 620 has an optical density in the shaded region of the FIG. 5, such that the optical density below 570 nm is even higher than the minimum defined in the prior figure, and the optical density for the range from 600 to 700 nm is even lower than the maximum defined therein. Lenses with transmission curves close to transmission curve 620 can have inner products with large proportional differences. Since the area shown is small and the slope of the response curve is steep near the intersection of the curves, allowing more light in at a wavelength 10 nm to the left could easily increase the stimulation to the IPGRCs by an order of magnitude or more. That is, small changes in the transmission curve 620 result in large changes in this inner product.

Figure 7:
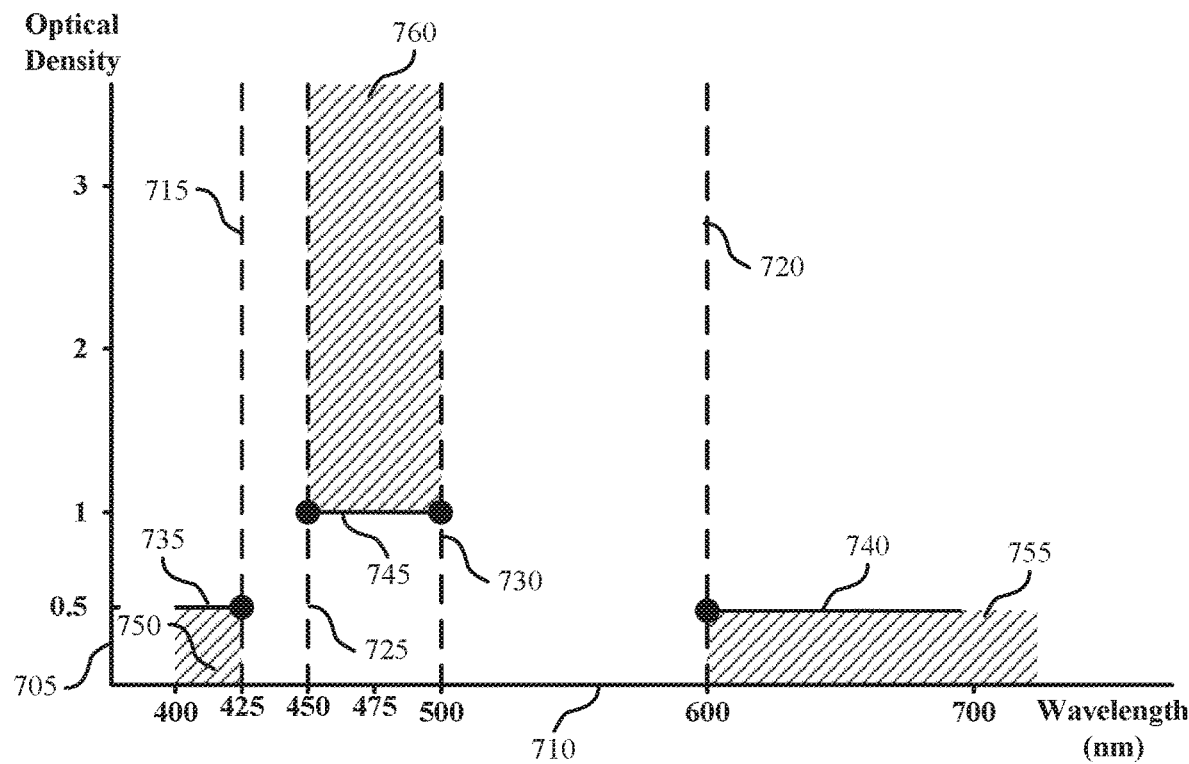
FIGS. 7 through 8 show diagrams of optical transmission graphs that supports protecting eyes from harmful radiation by varying the optical density of a lens in accordance with aspects of the present disclosure.

FIG. 7 shows a diagram 700 of an optical transmission graph that supports protecting eyes from harmful radiation by varying the optical density of a lens in accordance with aspects of the present disclosure. Specifically, diagram 700 represents an example of a set of transmission curves for lenses that allow the transmission of violet light.

Diagram 700 may include vertical axis 705, horizontal axis 710, first vertical line 715, second vertical line 720, third vertical line 725, fourth vertical line 730, first horizontal line 735, second horizontal line 740, third horizontal line 745, first shaded region 750, second shaded region 755, and third shaded region 760.

A curve along this graph can define the optical properties of a lens across the entire visible light spectrum. This enables us to refer to the set of curves that passes through the shaded regions shown, with the curve taking any functional value along the regions of the spectrum not subject to any constraint. The vertical dashed lines and horizontal lines are used to define a first shaded region 750 and a second shaded region 755 through which it would be beneficial to have the transmission curve of a particular lens pass.

The vertical axis 705 represents optical density. Optical density is a logarithmic measure of optical transmission of a structure such as a lens of a particular thickness where a value of 1 indicates 10% transmission and a value of 2 indicates 1% transmission. Vertical axis 705 may incorporate aspects of vertical axis 505, and 805 as described with reference to FIGS. 5, and 8.

The horizontal axis 710 represents the wavelength of light. The axes are labelled and intersect at the origin of the cartesian chart. The numbers are shown with ticks along the axis. The horizontal axis 710 defines the visible light spectrum, which could also be defined as going from 380 to 720 nanometers, and the vertical axis 705 defines optical density. Horizontal axis 710 may incorporate aspects of horizontal axis 510, 610, and 810 as described with reference to FIGS. 5, 6, and 8.

The first vertical line 715 represents a boundary at a wavelength of 425 nm. First vertical line 715 may incorporate aspects of first vertical line 515 and 815 as described with reference to FIGS. 5 and 8.

The second vertical line 720 represents a boundary at 600 nm. The dashed vertical lines rise from particular places along the horizontal axis 710, and the horizontal lines are in the chart at particular vertical positions, spanning a width that is constrained at each end by either a vertical dashed line, an axis line or by reaching the end of the region of interest where this is considered to be 400 or 700 nanometers. Second vertical line 720 may incorporate aspects of second vertical line 520 and 820 as described with reference to FIGS. 5 and 8.

The third vertical line 725 represents a boundary at a wavelength of 450 nm. The fourth vertical line 730 represents a boundary at a wavelength of 500 nm.

The first horizontal line 735 represents a boundary at an optical density of 0.5. First horizontal line 735 may incorporate aspects of first horizontal line 525 and 825 as described with reference to FIGS. 5 and 8.

The second horizontal line 740 represents a boundary at an optical density of 0.5. Second horizontal line 740 may incorporate aspects of second horizontal line 530 and 830 as described with reference to FIGS. 5 and 8.

The third horizontal line 745 represents a boundary at an optical density of 1. This makes it clear that the horizontal lines indicate that the curve must be equal or greater to the intersecting optical density of the vertical axis 705 along the entire horizontal section shown (were the line to extend to intersect the vertical axis 705) if it is shaded above the horizontal line, and equal to or lower optical density throughout the horizontally defined portion of the spectrum if it is shaded below.

The first shaded region 750 is bounded by the first vertical line 715 and the first horizontal line 735. First shaded region 750 may incorporate aspects of first shaded region 535 and 835 as described with reference to FIGS. 5 and 8. However, note that the second shaded region is below first horizontal line 735 in order to enable the transmission of light at these wavelengths.

The second shaded region 755 is bounded by the second vertical line 720 and the second horizontal line 740. Second shaded region 755 may incorporate aspects of second shaded region 540 and 840 as described with reference to FIGS. 5 and 8.

The third shaded region 760 is bounded by the third vertical line 725, the fourth vertical line 730, and the third horizontal line 745.

Thus, diagram 700 represents parameters for transmission curves that transmits a relatively high percentage of total visible light compared to what is achievable with a red lens subject to constraints illustrated by FIG. 5. At the same time diagram 700 may have a greater reduction of light in regions that stimulates IPGRCs than would be achievable by simply moving the first vertical line 715 towards 500 nm, (or even lower as is the case with yellow lenses). The IPGRC response curve does not only dip on the right side approaching 570 nm from the left, but it has a peak in the longer half of the blue range and decreases going left towards 400 nm. That is, it is less stimulating to the IPGRC to receive light in the range from 400 to 425 nm than in the range from 475 to 500 nm. Therefore, in a high transmission lens there may be less IPGRC stimulation if, instead of allowing more light from the right side of the response curve, more light is allowed to pass from the left side of the visible spectrum.

The benefits of allowing low wavelength light to pass are not limited to simply being able to see more light for a given reduction in light-driven response to IPGRCs. Another benefit is that colors appear less distorted. That is, by allowing some light in the violet range, a much greater color space is spanned compared to shifting a single crossover point in the blue or green range, and this minimizes color distortion. Enabling increased color distinction can be particularly valuable at night.

Figure 8:
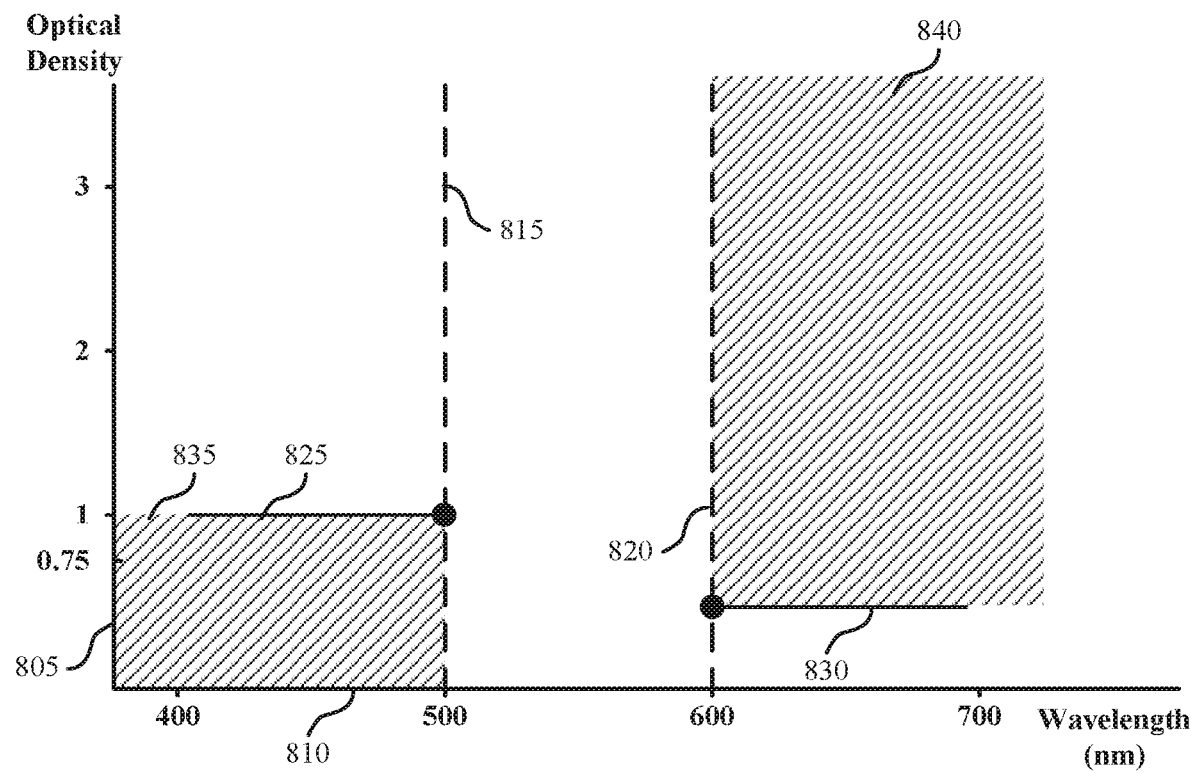

FIG. 8 shows a diagram 800 of an optical transmission graph that supports protecting eyes from harmful radiation by varying the optical density of a lens in accordance with aspects of the present disclosure. Specifically, diagram 800 represents a graph of constraints on transmission curves that allow blue light to pass and block red light (e.g., for eyeglasses to be used during daylight hours).

Diagram 800 may include vertical axis 805, horizontal axis 810, first vertical line 815, second vertical line 820, first horizontal line 825, second horizontal line 830, first shaded region 835, and second shaded region 840.

A curve along this graph can define the optical properties of a lens across the entire visible light spectrum. This enables us to refer to the set of curves that passes through the shaded regions shown, with the curve taking any functional value along the regions of the spectrum not subject to any constraint. The vertical dashed lines and horizontal lines are used to define a first shaded region 835 and a second shaded region 840 through which it would be beneficial to have the transmission curve of a particular lens pass.

The vertical axis 805 represents optical density. Optical density is a logarithmic measure of optical transmission of a structure such as a lens of a particular thickness where a value of 1 indicates 10% transmission and a value of 2 indicates 1% transmission. Vertical axis 805 may incorporate aspects of vertical axis 505, 605, and 705 as described with reference to FIGS. 5, 6, and 7.

The horizontal axis 810 represents the wavelength of light. The axes are labelled and intersect at the origin of the cartesian chart. The numbers are shown with ticks along the axis. The horizontal axis 810 defines the visible light spectrum, which could also be defined as going from 380 to 720 nanometers, and the vertical axis 805 defines optical density. Horizontal axis 810 may incorporate aspects of horizontal axis 510, 610, and 710 as described with reference to FIGS. 5, 6, and 7.

The first vertical line 815 represents a boundary at a wavelength of 500 nm. First vertical line 815 may incorporate aspects of first vertical line 515 and 715 as described with reference to FIGS. 5 and 7.

The second vertical line 820 represents a boundary at 600 nm. The dashed vertical lines rise from particular places along the horizontal axis 810, and the horizontal lines are in the chart at particular vertical positions, spanning a width that is constrained at each end by either a vertical dashed line, an axis line or by reaching the end of the region of interest where this is considered to be 400 or 700 nanometers. Second vertical line 820 may incorporate aspects of second vertical line 520 and 720 as described with reference to FIGS. 5 and 7.

The first horizontal line 825 represents a boundary at an optical density of 1. First horizontal line 825 may incorporate aspects of first horizontal line 525 and 735 as described with reference to FIGS. 5 and 7.

The second horizontal line 830 represents a boundary at an optical density of 0.75. Second horizontal line 830 may incorporate aspects of second horizontal line 530 and 740 as described with reference to FIGS. 5 and 7.

This makes it clear that the horizontal lines indicate that the curve must be equal or greater to the intersecting optical density of the vertical axis 805 along the entire horizontal section shown (were the line to extend to intersect the vertical axis 805) if it is shaded above the horizontal line, and equal to or lower optical density throughout the horizontally defined portion of the spectrum if it is shaded below.

The first shaded region 835 is bounded by the first vertical line 815 and the first horizontal line 825. First shaded region 835 may incorporate aspects of first shaded region 535 and 750 as described with reference to FIGS. 5 and 7. However, in contrast to first shaded region 535, first shaded region 835 represents the area below first vertical line 815.

The second shaded region 840 is bounded by the second vertical line 820 and the second horizontal line 830. Second shaded region 840 may incorporate aspects of second shaded region 540 and 755 as described with reference to FIGS. 5 and 7. However, in contrast to second shaded region 540, second shaded region 840 represents the area above second vertical line 820.

Thus, diagram 800 shows a set of curves that are beneficial for daytime use with sunglasses. The glasses described in above may be intended for use after sunset since they prevent or reduce the effects of nighttime light exposure (i.e., IPGRC stimulate). Glasses designed for use during daylight hours may have an inverted transmission curve. That is, sunglasses work effectively with some minimal optical density, such that increasing the relative amount of light transmission in the range that triggers an IPGRC response is sufficient. Such a system enables a greater amount of light during the day, which is particularly beneficial for people who spend part of their time indoors. Unlike the evening glasses, sunglasses may achieve these transmission curves in part with reflection.

In one embodiment, a red mirror coating may ensure that more light in the blue and green range passes the outer coating. The increase in IPGRC stimulation is ideally such that the total luminous intensity entering the eye increases (despite any possible pupil contraction).

Figure 9:
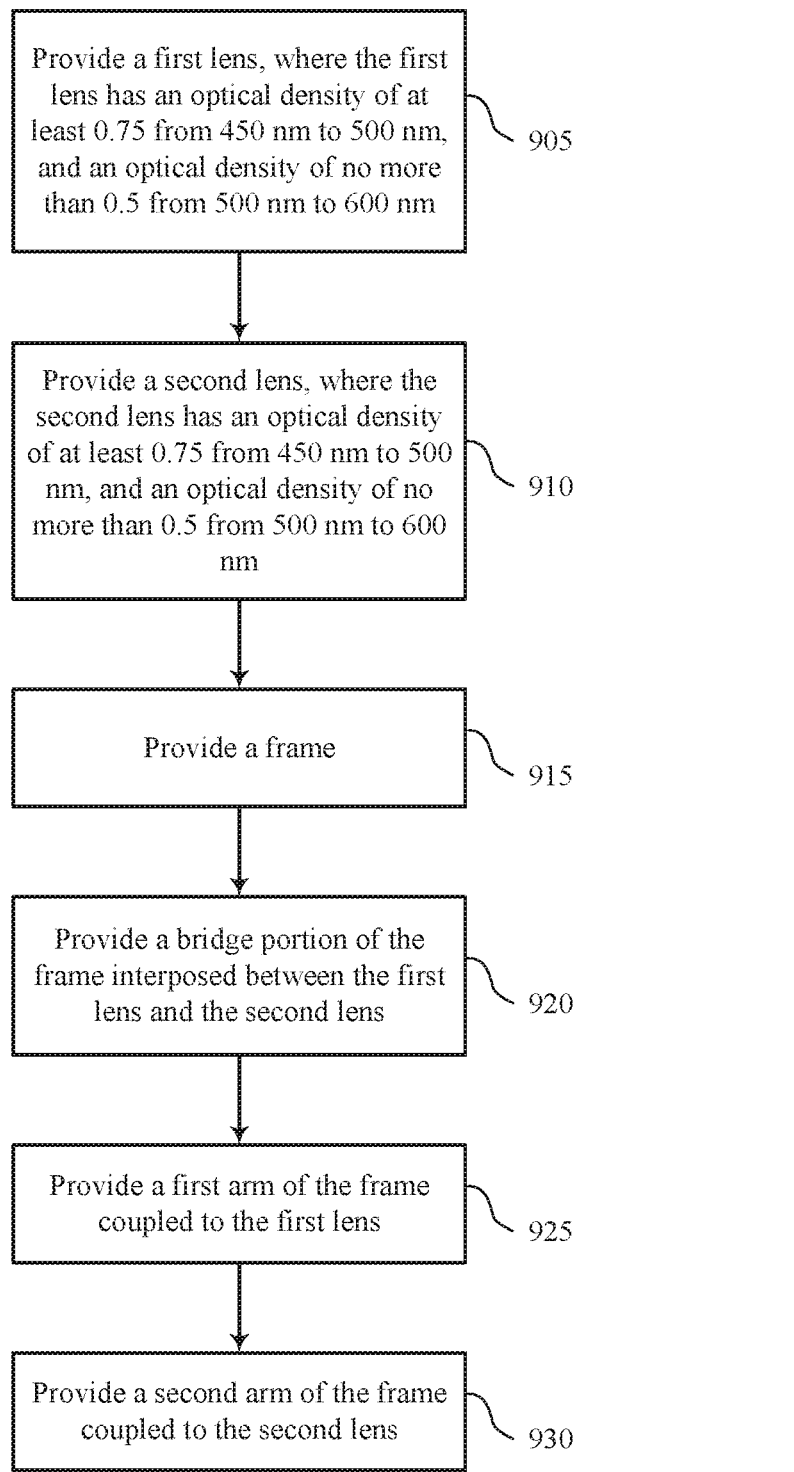
FIGS. 9 through 14 show flowcharts of processes for protecting eyes from harmful radiation by varying the optical density of a lens in accordance with aspects of the present disclosure.

FIG. 9 shows a flowchart 900 of a process for protecting eyes from harmful radiation by varying the optical density of a lens in accordance with aspects of the present disclosure. In some examples, a system may execute a set of codes to control functional elements of the system to perform the described functions. Additionally, or alternatively, a system may use special-purpose hardware.

At block 905 the system may provide a first lens, where the first lens has an optical density of at least 0.75 from 450 nm to 500 nm, and an optical density of no more than 0.5 from 500 nm to 600 nm. These operations may be performed according to the methods and processes described in accordance with aspects of the present disclosure. For example, the operations may be composed of various substeps, or may be performed in conjunction with other operations described herein. In certain examples, aspects of the described operations may provide first lens 115, 210, 310, and 420 as described with reference to FIGS. 1, 2, 3, and 4.

At block 910 the system may provide a second lens, where the second lens has an optical density of at least 0.75 from 450 nm to 500 nm, and an optical density of no more than 0.5 from 500 nm to 600 nm. These operations may be performed according to the methods and processes described in accordance with aspects of the present disclosure. For example, the operations may be composed of various substeps, or may be performed in conjunction with other operations described herein. In certain examples, aspects of the described operations may provide second lens 215 and 315 as described with reference to FIGS. 2 and 3.

At block 915 the system may provide a frame. These operations may be performed according to the methods and processes described in accordance with aspects of the present disclosure. For example, the operations may be composed of various substeps, or may be performed in conjunction with other operations described herein. In certain examples, aspects of the described operations may provide frame 120, 220, 320, and 415 as described with reference to FIGS. 1, 2, 3, and 4.

At block 920 the system may provide a bridge portion of the frame interposed between the first lens and the second lens. These operations may be performed according to the methods and processes described in accordance with aspects of the present disclosure. For example, the operations may be composed of various substeps, or may be performed in conjunction with other operations described herein. In certain examples, aspects of the described operations may provide bridge 225 and 325 as described with reference to FIGS. 2 and 3.

At block 925 the system may provide a first arm of the frame coupled to the first lens. These operations may be performed according to the methods and processes described in accordance with aspects of the present disclosure. For example, the operations may be composed of various substeps, or may be performed in conjunction with other operations described herein. In certain examples, aspects of the described operations may provide first arm 125, 230, and 330 as described with reference to FIGS. 1, 2, and 3.

At block 930 the system may provide a second arm of the frame coupled to the second lens. These operations may be performed according to the methods and processes described in accordance with aspects of the present disclosure. For example, the operations may be composed of various substeps, or may be performed in conjunction with other operations described herein. In certain examples, aspects of the described operations may provide second arm 235 and 335 as described with reference to FIGS. 2 and 3.

Figure 10:
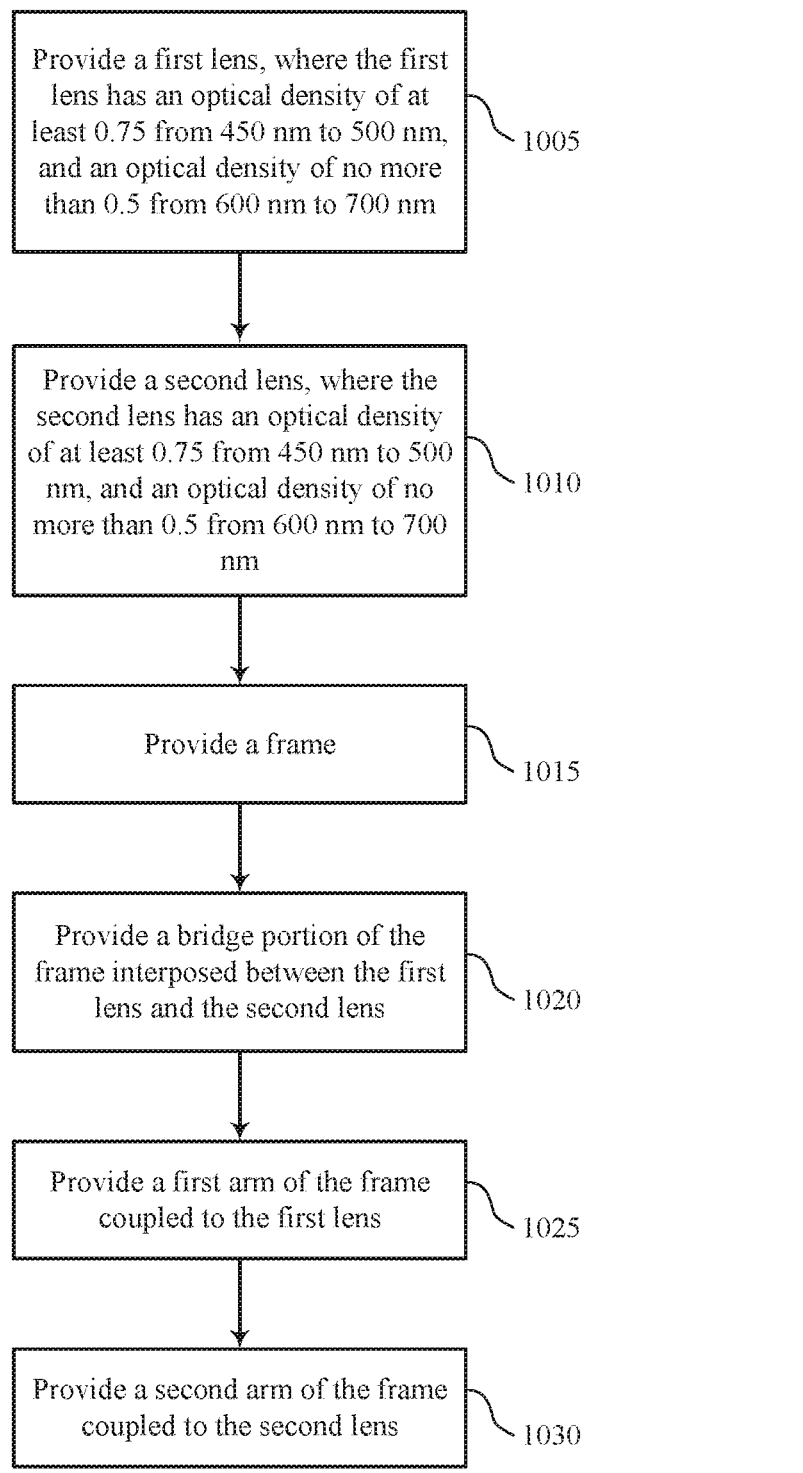

FIG. 10 shows a flowchart 1000 of a process for protecting eyes from harmful radiation by varying the optical density of a lens in accordance with aspects of the present disclosure. In some examples, a system may execute a set of codes to control functional elements of the system to perform the described functions. Additionally, or alternatively, a system may use special-purpose hardware.

At block 1005 the system may provide a first lens, where the first lens has an optical density of at least 0.75 from 450 nm to 500 nm, and an optical density of no more than 0.5 from 600 nm to 700 nm. These operations may be performed according to the methods and processes described in accordance with aspects of the present disclosure. For example, the operations may be composed of various substeps, or may be performed in conjunction with other operations described herein. In certain examples, aspects of the described operations may provide first lens 115, 210, 310, and 420 as described with reference to FIGS. 1, 2, 3, and 4.

At block 1010 the system may provide a second lens, where the second lens has an optical density of at least 0.75 from 450 nm to 500 nm, and an optical density of no more than 0.5 from 600 nm to 700 nm. These operations may be performed according to the methods and processes described in accordance with aspects of the present disclosure. For example, the operations may be composed of various substeps, or may be performed in conjunction with other operations described herein. In certain examples, aspects of the described operations may provide second lens 215 and 315 as described with reference to FIGS. 2 and 3.

At block 1015 the system may provide a frame. These operations may be performed according to the methods and processes described in accordance with aspects of the present disclosure. For example, the operations may be composed of various substeps, or may be performed in conjunction with other operations described herein. In certain examples, aspects of the described operations may provide frame 120, 220, 320, and 415 as described with reference to FIGS. 1, 2, 3, and 4.

At block 1020 the system may provide a bridge portion of the frame interposed between the first lens and the second lens. These operations may be performed according to the methods and processes described in accordance with aspects of the present disclosure. For example, the operations may be composed of various substeps, or may be performed in conjunction with other operations described herein. In certain examples, aspects of the described operations may provide bridge 225 and 325 as described with reference to FIGS. 2 and 3.

At block 1025 the system may provide a first arm of the frame coupled to the first lens. These operations may be performed according to the methods and processes described in accordance with aspects of the present disclosure. For example, the operations may be composed of various substeps, or may be performed in conjunction with other operations described herein. In certain examples, aspects of the described operations may provide first arm 125, 230, and 330 as described with reference to FIGS. 1, 2, and 3.

At block 1030 the system may provide a second arm of the frame coupled to the second lens. These operations may be performed according to the methods and processes described in accordance with aspects of the present disclosure. For example, the operations may be composed of various substeps, or may be performed in conjunction with other operations described herein. In certain examples, aspects of the described operations may provide second arm 235 and 335 as described with reference to FIGS. 2 and 3.

Figure 11:
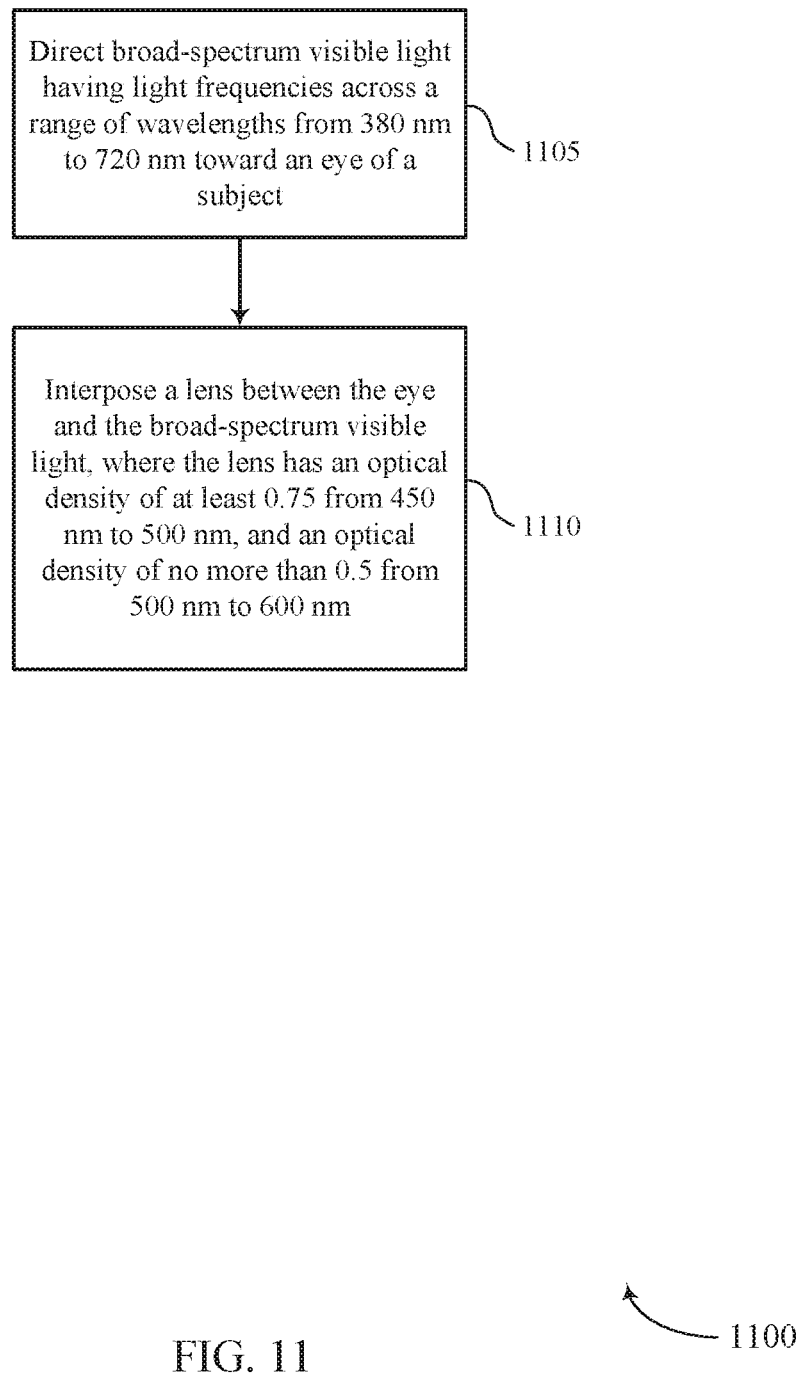

FIG. 11 shows a flowchart 1100 of a process for protecting eyes from harmful radiation by varying the optical density of a lens in accordance with aspects of the present disclosure.

At block 1105 the system may direct broad-spectrum visible light having light frequencies across a range of wavelengths from 380 nm to 720 nm toward an eye of a subject. These operations may be performed according to the methods and processes described in accordance with aspects of the present disclosure. For example, the operations may be composed of various substeps, or may be performed in conjunction with other operations described herein. In certain examples, aspects of the described operations may be performed by an eyeglass as described with reference to FIGS. 1, 2, 3, and 4.

At block 1110 the system may interpose a lens between the eye and the broad-spectrum visible light, where the lens has an optical density of at least 0.75 from 450 nm to 500 nm, and an optical density of no more than 0.5 from 500 nm to 600 nm. These operations may be performed according to the methods and processes described in accordance with aspects of the present disclosure. For example, the operations may be composed of various substeps, or may be performed in conjunction with other operations described herein. In certain examples, aspects of the described operations may be performed by lens 115, 210, 215, 310, 315, and 420 as described with reference to FIGS. 1, 2, 3, and 4.

In some examples, the lens defines an area of the eye covered by the lens and an area of the eye not covered by the lens, wherein the area of the eye not covered by the lens comprises 5% to 50% of a total area of the eye.

Figure 12:
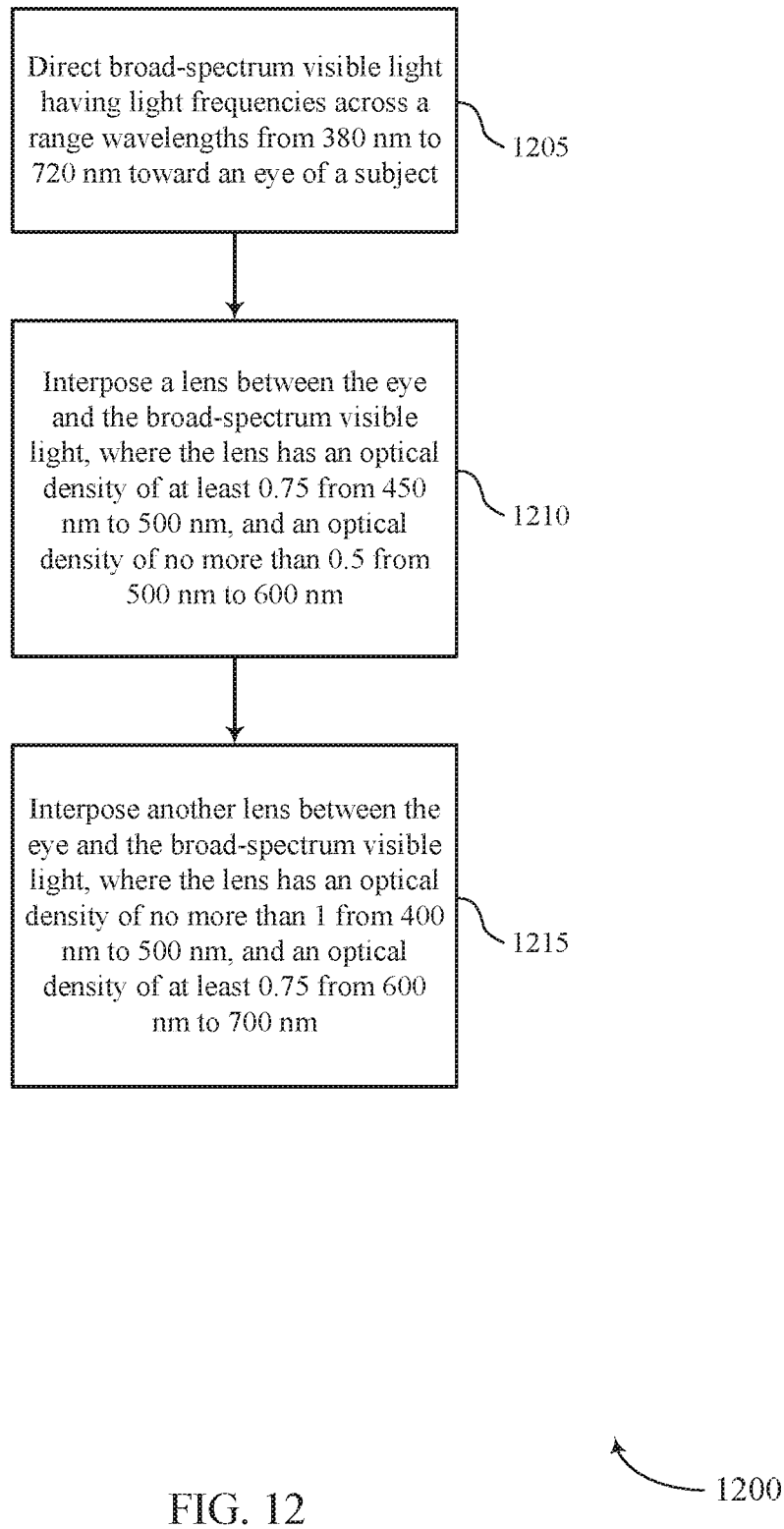

FIG. 12 shows a flowchart 1200 of a process for protecting eyes from harmful radiation by varying the optical density of a lens in accordance with aspects of the present disclosure. In some examples, a system may execute a set of codes to control functional elements of the system to perform the described functions. Additionally, or alternatively, a system may use special-purpose hardware.

At block 1205 the system may direct broad-spectrum visible light having light frequencies across a range of wavelengths from 380 nm to 720 nm toward an eye of a subject. These operations may be performed according to the methods and processes described in accordance with aspects of the present disclosure. For example, the operations may be composed of various substeps, or may be performed in conjunction with other operations described herein. In certain examples, aspects of the described operations may be performed by eyeglass as described with reference to FIGS. 1, 2, and 3.

At block 1210 the system may interpose a lens between the eye and the broad-spectrum visible light, where the lens has an optical density of at least 0.75 from 450 nm to 500 nm, and an optical density of no more than 0.5 from 500 nm to 600 nm. These operations may be performed according to the methods and processes described in accordance with aspects of the present disclosure. For example, the operations may be composed of various substeps, or may be performed in conjunction with other operations described herein. In certain examples, aspects of the described operations may be performed by lens 115, 210, 215, 310, 315, and 420 as described with reference to FIGS. 1, 2, 3, and 4.

At block 1215 the system may interpose another lens between the eye and the broad-spectrum visible light, where the lens has an optical density of no more than 1 from 400 nm to 500 nm, and an optical density of at least 0.75 from 600 nm to 700 nm. These operations may be performed according to the methods and processes described in accordance with aspects of the present disclosure. For example, the operations may be composed of various substeps, or may be performed in conjunction with other operations described herein. In certain examples, aspects of the described operations may be performed by first lens 115, 210, 215, 310, 315, and 420 as described with reference to FIGS. 1, 2, 3, and 4.

Figure 13:
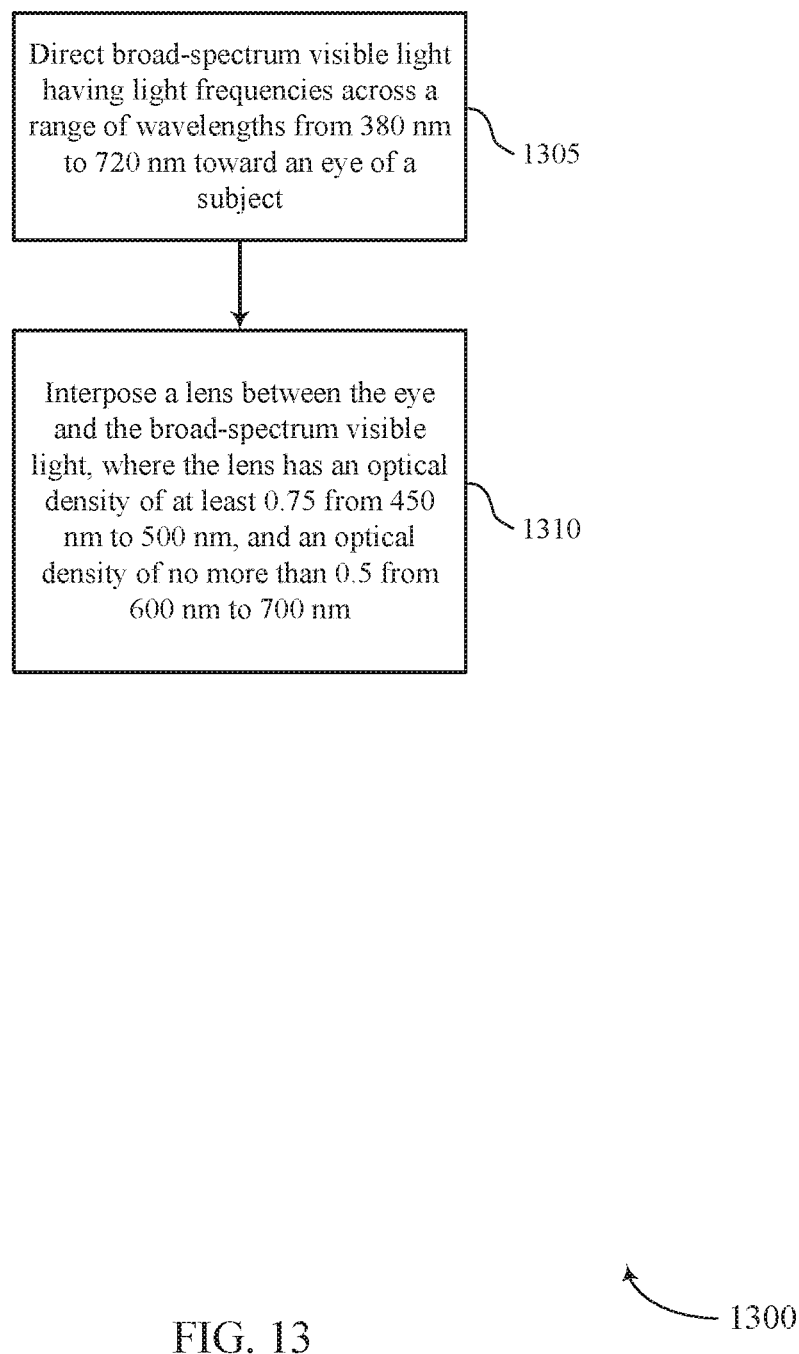

FIG. 13 shows a flowchart 1300 of a process for protecting eyes from harmful radiation by varying the optical density of a lens in accordance with aspects of the present disclosure. In some examples, a system may execute a set of codes to control functional elements of the system to perform the described functions. Additionally, or alternatively, a system may use special-purpose hardware.

At block 1305 the system may direct broad-spectrum visible light having light frequencies across a range of wavelengths from 380 nm to 720 nm toward an eye of a subject. These operations may be performed according to the methods and processes described in accordance with aspects of the present disclosure. For example, the operations may be composed of various substeps, or may be performed in conjunction with other operations described herein. In certain examples, aspects of the described operations may be performed by eyeglass as described with reference to FIGS. 1, 2, and 3.

At block 1310 the system may interpose a lens between the eye and the broad-spectrum visible light, where the lens has an optical density of at least 0.75 from 450 nm to 500 nm, and an optical density of no more than 0.5 from 600 nm to 700 nm. These operations may be performed according to the methods and processes described in accordance with aspects of the present disclosure. For example, the operations may be composed of various substeps, or may be performed in conjunction with other operations described herein. In certain examples, aspects of the described operations may be performed by lens 115, 210, 215, 310, 315, and 420 as described with reference to FIGS. 1, 2, 3, and 4.

In some examples, the lens defines an area of the eye covered by the lens and an area of the eye not covered by the lens, wherein the area of the eye not covered by the lens comprises 5% to 50% of a total area of the eye.

Figure 14:
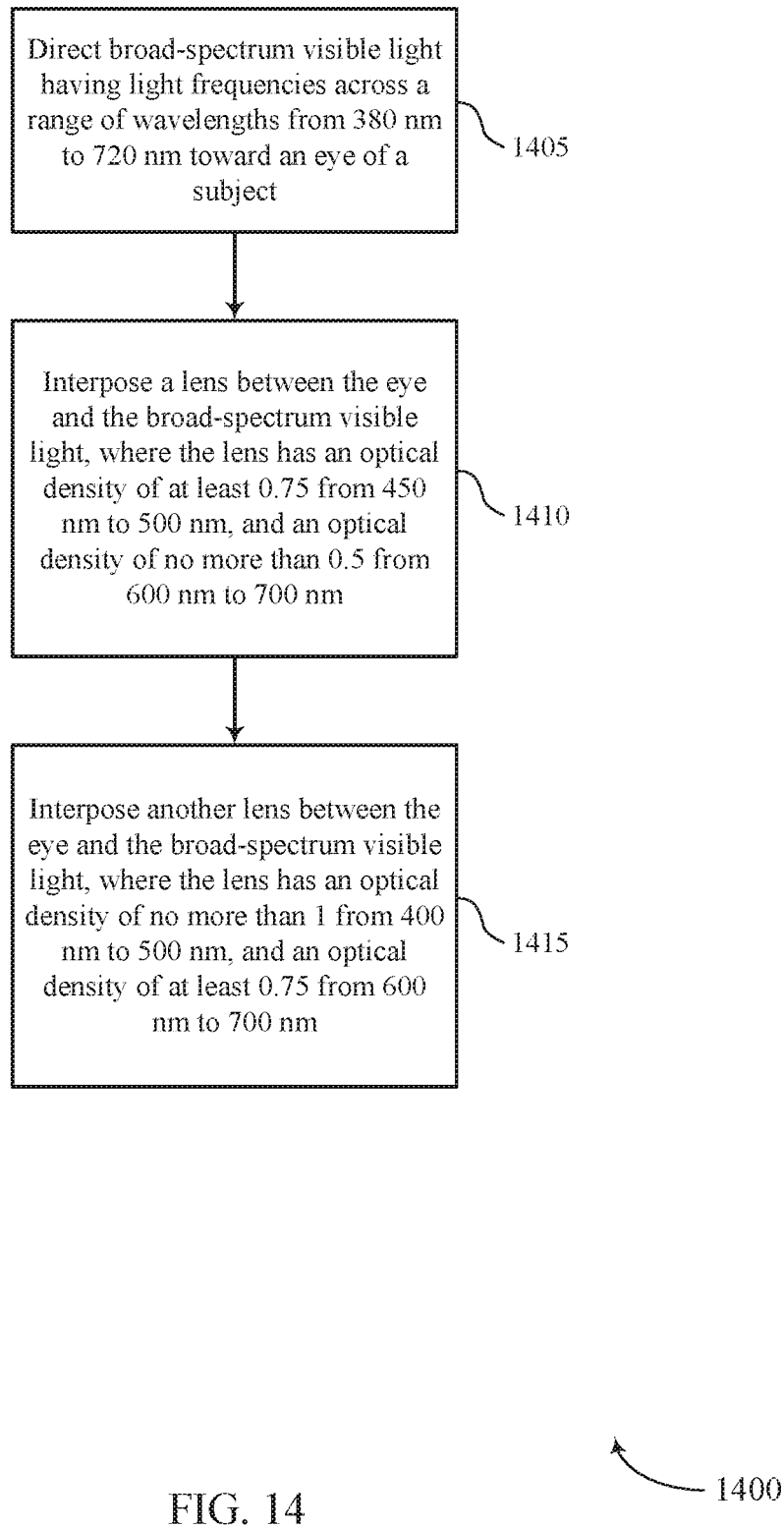

FIG. 14 shows a flowchart 1400 of a process for protecting eyes from harmful radiation by varying the optical density of a lens in accordance with aspects of the present disclosure. In some examples, a system may execute a set of codes to control functional elements of the system to perform the described functions. Additionally, or alternatively, a system may use special-purpose hardware.

At block 1405 the system may direct broad-spectrum visible light having light frequencies across a range of wavelengths from 380 nm to 720 nm toward an eye of a subject. These operations may be performed according to the methods and processes described in accordance with aspects of the present disclosure. For example, the operations may be composed of various substeps, or may be performed in conjunction with other operations described herein. In certain examples, aspects of the described operations may be performed by eyeglass as described with reference to FIGS. 1, 2, and 3.

At block 1410 the system may interpose a lens between the eye and the broad-spectrum visible light, where the lens has an optical density of at least 0.75 from 450 nm to 500 nm, and an optical density of no more than 0.5 from 600 nm to 700 nm. These operations may be performed according to the methods and processes described in accordance with aspects of the present disclosure. For example, the operations may be composed of various substeps, or may be performed in conjunction with other operations described herein. In certain examples, aspects of the described operations may be performed by lens 115, 210, 215, 310, 315, and 420 as described with reference to FIGS. 1, 2, 3, and 4.

At block 1415 the system may interpose another lens between the eye and the broad-spectrum visible light, where the lens has an optical density of no more than 1 from 400 nm to 500 nm, and an optical density of at least 0.75 from 600 nm to 700 nm. These operations may be performed according to the methods and processes described in accordance with aspects of the present disclosure. For example, the operations may be composed of various substeps, or may be performed in conjunction with other operations described herein. In certain examples, aspects of the described operations may be performed by lens 115, 210, 215, 310, 315, and 420 as described with reference to FIGS. 1, 2, 3, and 4.

While the invention herein disclosed has been described by means of specific embodiments, examples and applications thereof, numerous modifications and variations could be made thereto by those skilled in the art without departing from the scope of the invention set forth in the claims.

What is claimed is:

1. An apparatus for eye protection, comprising:
    a first lens, wherein the first lens has an optical density of at least 0.75 from 450 nm to 500 nm, and an optical density of no more than 0.5 from 500 nm to 600 nm;
    a second lens, wherein the second lens has an optical density of at least 0.75 from 450 nm to 500 nm, and an optical density of no more than 0.5 from 500 nm to 600 nm;
    a frame comprising:
        a bridge portion of the frame interposed between the first lens and the second lens;
        a first arm of the frame coupled to the first lens;
        a second arm of the frame coupled to the second lens; and
    wherein the first lens and the second lens define an area of a person's eyes covered by the first lens and the second lens and an area of the person's eyes not covered by the first lens and the second lens, wherein the area of the person's eyes not covered by the first lens and the second lens comprises 5% to 50% of a total area of the person's eyes.

2. The apparatus of claim 1, wherein:
    the first lens has an optical density of at least 0.75 from 450 nm to 540 nm; and
    the second lens has an optical density of at least 0.75 from 450 nm to 540 nm.

3. The apparatus of claim 1, wherein:
    the first lens has an optical density of at least 0.75 from 450 nm to 550 nm; and
    the second lens has an optical density of at least 0.75 from 450 nm to 550 nm.

4. The apparatus of claim 1, wherein:
    the first lens has an optical density of at least 0.75 from 450 nm to 560 nm; and
    the second lens has an optical density of at least 0.75 from 450 nm to 560 nm.

5. The apparatus of claim 1, wherein:
    the first lens has an optical density of at least 0.75 from 450 nm to 570 nm; and
    the second lens has an optical density of at least 0.75 from 450 nm to 570 nm.

6. The apparatus of claim 1, wherein:
    the first lens has an optical density of at least 0.75 from 450 nm to 580 nm; and
    the second lens has an optical density of at least 0.75 from 450 nm to 580 nm.

7. The apparatus of claim 1, wherein:
    the first lens and the second lens define an area of the person's eyes covered by the first lens and the second lens and an area of the person's eyes not covered by the first lens and the second lens, wherein the area of the person's eyes not covered by the first lens and the second lens comprises 20% of said total area of the person's eyes.

8. The apparatus of claim 1, wherein:
    the first lens has an optical density of at least 1 from 400 nm to 500 nm, and an optical density of no more than 0.5 from 500 nm to 600 nm; and
    the second lens has an optical density of at least 1 from 400 nm to 500 nm, and an optical density of no more than 0.5 from 500 nm to 600 nm.

9. The apparatus of claim 1, wherein:
    said frame further comprises: a camera.

10. The apparatus of claim 1, wherein:
    said frame further comprises: a sensor configured to determine whether the eyeglass is being worn.

11. An apparatus for eye protection, comprising:
    a first lens, wherein the first lens has an optical density of at least 0.75 from 450 nm to 500 nm, and an optical density of no more than 0.5 from 600 nm to 700 nm;
    a second lens, wherein the second lens has an optical density of at least 0.75 from 450 nm to 500 nm, and an optical density of no more than 0.5 from 600 nm to 700 nm;
    a frame comprising:
        a bridge portion of the frame interposed between the first lens and the second lens;
        a first arm of the frame coupled to the first lens;
        a second arm of the frame coupled to the second lens; and
    wherein the first lens and the second lens define an area of a person's eyes covered by the first lens and the second lens and an area of the person's eyes not covered by the first lens and the second lens, wherein the area of the person's eyes not covered by the first lens and the second lens comprises 5% to 50% of a total area of the person's eyes.

12. The apparatus of claim 11, wherein:
    the first lens has optical density of no more than 0.5 from 400 nm to 425 nm; and the second lens has an optical density of no more than 0.5 from 400 nm to 425 nm.

13. A method of making a system for eye protection, comprising:
providing a first lens, wherein the first lens has an optical density of at least 0.75 from 450 nm to 500 nm, and an optical density of no more than 0.5 from 500 nm to 600 nm;
providing a second lens, wherein the second lens has an optical density of at least 0.75 from 450 nm to 500 nm, and an optical density of no more than 0.5 from 500 nm to 600 nm;
providing a frame;
providing a bridge portion of the frame interposed between the first lens and the second lens;
providing a first arm of the frame coupled to the first lens;
providing a second arm of the frame coupled to the second lens; and
wherein the first lens and the second lens define an area of a person's eyes covered by the first lens and the second lens and an area of the person's eyes not covered by the first lens and the second lens, wherein the area of the person's eyes not covered by the first lens and the second lens comprises 5% to 50% of a total area of the person's eyes.

14. The method of claim 13, wherein:
the first lens has an optical density of at least 0.75 from 450 nm to 540 nm; and
the second lens has an optical density of at least 0.75 from 450 nm to 540 nm.

15. The method of claim 13, wherein:
the first lens has an optical density of at least 0.75 from 450 nm to 550 nm; and
the second lens has an optical density of at least 0.75 from 450 nm to 550 nm.

16. The method of claim 13, wherein:
the first lens has an optical density of at least 0.75 from 450 nm to 560 nm; and
the second lens has an optical density of at least 0.75 from 450 nm to 560 nm.

17. The method of claim 13, wherein:
the first lens has an optical density of at least 0.75 from 450 nm to 570 nm; and
the second lens has an optical density of at least 0.75 from 450 nm to 570 nm.

18. The method of claim 13, wherein:
the first lens has an optical density of at least 0.75 from 450 nm to 580 nm; and
the second lens has an optical density of at least 0.75 from 450 nm to 580 nm.

19. The method of claim 13, wherein:
the first lens and the second lens define an area of the person's eyes covered by the first lens and the second lens and an area of the person's eyes not covered by the first lens and the second lens, wherein the area of the person's eyes not covered by the first lens and the second lens comprises 20% of said total area of the person's eyes.

20. The method of claim 13, wherein:
the first lens has an optical density of at least 1 from 400 nm to 500 nm, and an optical density of no more than 0.5 from 500 nm to 600 nm; and
the second lens has an optical density of at least 1 from 400 nm to 500 nm, and an optical density of no more than 0.5 from 500 nm to 600 nm.

21. The method of claim 13, wherein:
said frame further comprises:
a camera.

22. The method of claim 13, wherein:
said frame further comprises:
a sensor configured to determine whether the eyeglass is being worn.

23. A method of making a system for eye protection, comprising:
providing a first lens, wherein the first lens has an optical density of at least 0.75 from 450 nm to 500 nm, and an optical density of no more than 0.5 from 600 nm to 700 nm;
providing a second lens, wherein the second lens has an optical density of at least 0.75 from 450 nm to 500 nm, and an optical density of no more than 0.5 from 600 nm to 700 nm;
providing a frame;
providing a bridge portion of the frame interposed between the first lens and the second lens;
providing a first arm of the frame coupled to the first lens;
providing a second arm of the frame coupled to the second lens; and
wherein the first lens and the second lens define an area of a person's eyes covered by the first lens and the second lens and an area of the person's eyes not covered by the first lens and the second lens, wherein the area of the person's eyes not covered by the first lens and the second lens comprises 5% to 50% of a total area of the person's eyes.

24. The method of claim 23, wherein:
the first lens has optical density of no more than 0.5 from 400 nm to 425 nm; and
the second lens has an optical density of no more than 0.5 from 400 nm to 425 nm.

25. A method for eye protection, comprising:
using a first lens, wherein the first lens has an optical density of at least 0.75 from 450 nm to 500 nm, and an optical density of no more than 0.5 from 500 nm to 600 nm;
using a second lens, wherein the second lens has an optical density of at least 0.75 from 450 nm to 500 nm, and an optical density of no more than 0.5 from 500 nm to 600 nm;
using a frame;
using a bridge portion of the frame interposed between the first lens and the second lens;
using a first arm of the frame coupled to the first lens;
using a second arm of the frame coupled to the second lens; and
wherein the first lens and the second lens define an area of a person's eyes covered by the first lens and the second lens and an area of the person's eyes not covered by the first lens and the second lens, wherein the area of the person's eyes not covered by the first lens and the second lens comprises 5% to 50% of a total area of the person's eyes.

26. The method of claim 25, wherein:
the first lens has an optical density of at least 0.75 from 450 nm to 540 nm; and
the second lens has an optical density of at least 0.75 from 450 nm to 540 nm.

27. The method of claim 25, wherein:
the first lens has an optical density of at least 0.75 from 450 nm to 550 nm; and
the second lens has an optical density of at least 0.75 from 450 nm to 550 nm.

28. The method of claim 25, wherein:
the first lens has an optical density of at least 0.75 from 450 nm to 560 nm; and
the second lens has an optical density of at least 0.75 from 450 nm to 560 nm.

29. The method of claim 25, wherein:
the first lens has an optical density of at least 0.75 from 450 nm to 570 nm; and
the second lens has an optical density of at least 0.75 from 450 nm to 570 nm.

30. The method of claim 25, wherein:
the first lens has an optical density of at least 0.75 from 450 nm to 580 nm; and
the second lens has an optical density of at least 0.75 from 450 nm to 580 nm.

31. The method of claim 25, wherein:
the first lens and the second lens define an area of the person's eyes covered by the first lens and the second lens and an area of the person's eyes not covered by the first lens and the second lens, wherein the area of the person's eyes not covered by the first lens and the second lens comprises 20% of said total area of the person's eyes.

32. The method of claim 25, wherein:
the first lens has an optical density of at least 1 from 400 nm to 500 nm, and an optical density of no more than 0.5 from 500 nm to 600 nm; and
the second lens has an optical density of at least 1 from 400 nm to 500 nm, and an optical density of no more than 0.5 from 500 nm to 600 nm.

33. The method of claim 25, wherein:
said frame further comprises: a camera.

34. The method of claim 25, wherein:
said frame further comprises: a sensor configured to determine whether the eyeglass is being worn.

35. A method for eye protection, comprising:
using a first lens, wherein the first lens has an optical density of at least 0.75 from 450 nm to 500 nm, and an optical density of no more than 0.5 from 600 nm to 700 nm;
using a second lens, wherein the second lens has an optical density of at least 0.75 from 450 nm to 500 nm, and an optical density of no more than 0.5 from 600 nm to 700 nm;
using a frame;
using a bridge portion of the frame interposed between the first lens and the second lens;
using a first arm of the frame coupled to the first lens;
using a second arm of the frame coupled to the second lens; and
wherein the first lens and the second lens define an area of a person's eyes covered by the first lens and the second lens and an area of the person's eyes not covered by the first lens and the second lens, wherein the area of the person's eyes not covered by the first lens and the second lens comprises 5% to 50% of a total area of the person's eyes.

36. The method of claim 35, wherein:
the first lens has optical density of no more than 0.5 from 400 nm to 425 nm; and
the second lens has an optical density of no more than 0.5 from 400 nm to 425 nm.

37. A method for eye protection, comprising:
directing broad-spectrum visible light having light frequencies across a range of wavelengths from 380 nm to 720 nm toward an eye of a subject;
interposing a lens between the eye and the broad-spectrum visible light, wherein the lens has an optical density of at least 0.75 from 450 nm to 500 nm, and an optical density of no more than 0.5 from 500 nm to 600 nm; and
wherein the lens defines an area of the eye covered by the lens and an area of the eye not covered by the lens, wherein the area of the eye not covered by the lens comprises 5% to 50% of a total area of the eye.

38. The method of claim 37, wherein:
said interposing comprises interposing said lens at nighttime.

39. The method of claim 37, further comprising:
interposing another lens between the eye and the broad-spectrum visible light, wherein the lens has an optical density of no more than 1 from 400 nm to 500 nm, and an optical density of at least 0.75 from 600 nm to 700 nm.

40. The method of claim 39, wherein:
said interposing said other lens comprises interposing said other lens at daytime.

41. A method for eye protection, comprising:
directing broad-spectrum visible light having light frequencies across a range of wavelengths from 380 nm to 720 nm toward an eye of a subject;
interposing a lens between the eye and the broad-spectrum visible light, wherein the lens has an optical density of at least 0.75 from 450 nm to 500 nm, and an optical density of no more than 0.5 from 600 nm to 700 nm; and
wherein the lens defines an area of the eye covered by the lens and an area of the eye not covered by the lens, wherein the area of the eye not covered by the lens comprises 5% to 50% of a total area of the eye.

42. The method of claim 41, wherein:
said interposing comprises interposing said lens at nighttime.

43. The method of claim 41, further comprising:
interposing another lens between the eye and the broad-spectrum visible light, wherein the lens has an optical density of no more than 1 from 400 nm to 500 nm, and an optical density of at least 0.75 from 600 nm to 700 nm.

44. The method of claim 43, wherein:
said interposing said other lens comprises secondly interposing said other lens at daytime.

45. A system for eye protection, comprising:
a frame; and
one or more lenses, wherein the system is configured to:
direct broad-spectrum visible light having light frequencies across a range of wavelengths from 380 nm to 720 nm toward an eye of a subject;
interpose a lens between the eye and the broad-spectrum visible light, wherein the lens has an optical density of at least 0.75 from 450 nm to 500 nm, and an optical density of no more than 0.5 from 500 nm to 600 nm; and
wherein the lens defines an area of the eye covered by the lens and an area of the eye not covered by the lens, wherein the area of the eye not covered by the lens comprises 5% to 50% of a total area of the eye.

46. The system of claim 45, wherein:
said interposing comprises interposing said lens at nighttime.

47. The system of claim 45, wherein the system is further configured to:

interpose another lens between the eye and the broad-spectrum visible light, wherein the lens has an optical density of no more than 1 from 400 nm to 500 nm, and an optical density of at least 0.75 from 600 nm to 700 nm.

48. The system of claim 47, wherein:
said interposing said other lens comprises interposing said other lens at daytime.

49. A system for eye protection, comprising:
a frame; and
one or more lenses, wherein the system is configured to:
   direct broad-spectrum visible light having light frequencies across a range of wavelengths from 380 nm to 720 nm toward an eye of a subject;
   interpose a lens between the eye and the broad-spectrum visible light, wherein the lens has an optical density of at least 0.75 from 450 nm to 500 nm, and an optical density of no more than 0.5 from 600 nm to 700 nm; and
   wherein the lens defines an area of the eye covered by the lens and an area of the eye not covered by the lens, wherein the area of the eye not covered by the lens comprises 5% to 50% of a total area of the eye.

50. The system of claim 49, wherein:
said interposing comprises interposing said lens at nighttime.

51. The system of claim 49, wherein the system is further configured to:
   interpose another lens between the eye and the broad-spectrum visible light, wherein the lens has an optical density of no more than 1 from 400 nm to 500 nm, and an optical density of at least 0.75 from 600 nm to 700 nm.

52. The system of claim 51, wherein:
said interposing said other lens comprises secondly interposing said other lens at daytime.

53. An apparatus for eye protection, comprising:
means for directing broad-spectrum visible light having light frequencies across a range of wavelengths from 380 nm to 720 nm toward an eye of a subject;
means for interposing a lens between the eye and the broad-spectrum visible light, wherein the lens has an optical density of at least 0.75 from 450 nm to 500 nm, and an optical density of no more than 0.5 from 500 nm to 600 nm; and
wherein the lens defines an area of the eye covered by the lens and an area of the eye not covered by the lens, wherein the area of the eye not covered by the lens comprises 5% to 50% of a total area of the eye.

54. The apparatus of claim 53, wherein:
said interposing comprises interposing said lens at nighttime.

55. The apparatus of claim 53, further comprising:
means for interposing another lens between the eye and the broad-spectrum visible light, wherein the lens has an optical density of no more than 1 from 400 nm to 500 nm, and an optical density of at least 0.75 from 600 nm to 700 nm.

56. The apparatus of claim 55, wherein:
said interposing said other lens comprises interposing said other lens at daytime.

57. An apparatus for eye protection, comprising:
means for directing broad-spectrum visible light having light frequencies across a range of wavelengths from 380 nm to 720 nm toward an eye of a subject;
means for interposing a lens between the eye and the broad-spectrum visible light, wherein the lens has an optical density of at least 0.75 from 450 nm to 500 nm, and an optical density of no more than 0.5 from 600 nm to 700 nm; and
wherein the lens defines an area of the eye covered by the lens and an area of the eye not covered by the lens, wherein the area of the eye not covered by the lens comprises 5% to 50% of a total area of the eye.

58. The apparatus of claim 57, wherein:
said interposing comprises interposing said lens at nighttime.

59. The apparatus of claim 57, further comprising:
means for interposing another lens between the eye and the broad-spectrum visible light, wherein the lens has an optical density of no more than 1 from 400 nm to 500 nm, and an optical density of at least 0.75 from 600 nm to 700 nm.

60. The apparatus of claim 59, wherein:
said interposing said other lens comprises secondly interposing said other lens at daytime.

* * * * *